United States Patent
Weifenbach et al.

(12)

(10) Patent No.: US 10,450,005 B2
(45) Date of Patent: Oct. 22, 2019

(54) OFFSET WASHER FOR ADJUSTING CAMBER ANGLE

(71) Applicant: Niwot Corporation, Longmont, CO (US)

(72) Inventors: Jesse Aaron Weifenbach, Thornton, CO (US); Raymond Puckett, Northglenn, CO (US)

(73) Assignee: NIWOT CORPORATION, Longmont, CO (US)

( * ) Notice: Subject to any disclaimer, the term of this patent is extended or adjusted under 35 U.S.C. 154(b) by 0 days.

(21) Appl. No.: 14/799,384

(22) Filed: Jul. 14, 2015

(65) Prior Publication Data

US 2017/0015356 A1   Jan. 19, 2017

(51) Int. Cl.
| | |
|---|---|
| B62D 17/00 | (2006.01) |
| B60G 7/02 | (2006.01) |
| B60G 15/06 | (2006.01) |
| F16B 35/04 | (2006.01) |
| F16B 5/02 | (2006.01) |
| F16B 43/00 | (2006.01) |

(52) U.S. Cl.
CPC ............... B62D 17/00 (2013.01); B60G 7/02 (2013.01); B60G 15/068 (2013.01); B60G 2200/142 (2013.01); B60G 2200/46 (2013.01); B60G 2204/129 (2013.01); B60G 2204/42 (2013.01); B60G 2204/4304 (2013.01); B60G 2204/4402 (2013.01); B60G 2204/61 (2013.01); B60G 2206/8207 (2013.01); F16B 5/0225 (2013.01); F16B 35/041 (2013.01); F16B 43/00 (2013.01)

(58) Field of Classification Search
CPC .. B62D 17/00; B60G 50/068; B60G 2200/46; B60G 2204/4402; B60G 2204/61; B60G 2204/42; B60G 15/068
USPC .............. 280/86.753, 86.75, 86.751, 86.752, 280/86.754, 86.755, 86.756
See application file for complete search history.

(56) References Cited

U.S. PATENT DOCUMENTS

| | | | |
|---|---|---|---|
| 1,943,721 A | 1/1934 | Carpenter et al. | |
| 2,198,544 A | 4/1940 | Leighton | |

(Continued)

FOREIGN PATENT DOCUMENTS

| | | |
|---|---|---|
| CA | 2047580 A1 | 8/1992 |
| CA | 2161637 A1 | 11/1994 |

(Continued)

OTHER PUBLICATIONS

"Mercedes Benz A 2023300118 Eccentric Bolt Kit," The Way Back Machine, Jan. 15, 2015 (5 pages).

(Continued)

*Primary Examiner* — Keith J Frisby
(74) *Attorney, Agent, or Firm* — Dorsey & Whitney LLP

(57) ABSTRACT

An offset washer for adjusting the camber angle in a vehicle is disclosed. The offset washer includes a body having an upper surface and a lower surface, an aperture extending through the body, and a protrusion having a longitudinal width different than the body thickness. The protrusion is configured to be inserted into a receiving aperture on a flange of a vehicle suspension system. The protrusion is defined by a formed upset defining a step in the material along a portion of the edge of the aperture, which is formed by upsetting the portion of the edge of the aperture when forming the aperture.

9 Claims, 30 Drawing Sheets

(56) References Cited

U.S. PATENT DOCUMENTS

| | | |
|---|---|---|
| 2,990,901 A | 7/1961 | Chayne |
| 3,163,441 A | 12/1964 | Traugott |
| 3,526,413 A | 9/1970 | Muller |
| 3,880,444 A * | 4/1975 | Bridges .................. B62D 17/00 |
| | | 280/86.753 |
| 3,917,308 A | 11/1975 | Schulz |
| 4,194,760 A | 3/1980 | Harata et al. |
| 4,313,617 A | 2/1982 | Muramatsu et al. |
| 4,418,938 A | 12/1983 | Sullivan et al. |
| 4,420,170 A | 12/1983 | Wysocki |
| 4,424,984 A | 1/1984 | Shiratori et al. |
| 4,462,241 A | 7/1984 | Whisenant |
| 4,462,609 A | 7/1984 | Von |
| 4,493,493 A | 1/1985 | Satchell et al. |
| 4,537,420 A | 8/1985 | Ito et al. |
| 4,580,807 A | 4/1986 | Cox et al. |
| 4,614,359 A | 9/1986 | Lundin et al. |
| 4,616,845 A | 10/1986 | Pettibone |
| 4,618,162 A | 10/1986 | Specktor et al. |
| 4,619,465 A | 10/1986 | Johnson |
| 4,650,208 A | 3/1987 | Mason |
| 4,695,073 A | 9/1987 | Pettibone et al. |
| 4,706,987 A | 11/1987 | Pettibone et al. |
| 4,718,691 A | 1/1988 | Specktor et al. |
| 4,733,884 A | 3/1988 | Pettibone et al. |
| 4,736,964 A | 4/1988 | Specktor |
| 4,754,857 A | 7/1988 | Urban |
| 4,863,187 A | 9/1989 | Artz |
| 4,895,383 A | 1/1990 | Abe et al. |
| RE33,179 E | 3/1990 | Pettibone |
| 4,921,271 A | 5/1990 | Berry et al. |
| 4,982,977 A | 1/1991 | Shimada |
| 5,007,658 A | 4/1991 | Blechschmidt et al. |
| 5,080,388 A | 1/1992 | Berry et al. |
| 5,104,141 A | 4/1992 | Grove et al. |
| 5,110,151 A | 5/1992 | Blechschmidt et al. |
| 5,129,669 A | 7/1992 | Specktor et al. |
| 5,163,699 A | 11/1992 | Specktor |
| 5,301,977 A | 4/1994 | Schlosser et al. |
| 5,622,378 A | 4/1997 | Schlosser et al. |
| 5,779,260 A * | 7/1998 | Reilly .................. B60G 15/07 |
| | | 280/86.754 |
| 5,836,597 A | 11/1998 | Schlosser et al. |
| 6,036,205 A | 3/2000 | Schlosser et al. |
| 6,302,416 B1 | 10/2001 | Schmack |
| 8,544,861 B2 | 10/2013 | Frens |
| 2006/0088398 A1 | 4/2006 | Lund |

FOREIGN PATENT DOCUMENTS

| | | |
|---|---|---|
| DE | 3714689 A1 | 11/1988 |
| EP | 0255921 A2 | 2/1988 |
| JP | 3161088 U | 7/2010 |
| KR | 2010-070459 A * | 6/2010 |
| KR | 101314344 B1 * | 10/2013 |
| WO | 9425326 A1 | 11/1994 |

OTHER PUBLICATIONS

Specialty Products Company, "Total Wheel Alignment Seminar Instruction Manual." 73 pages.
Moog Automotive Services, "Front End Service Manual." Mar. 1982, 164 pages.
Specialty Products Company. "85500 Rear Toe Adjustment Kit" Instructions, 1 page.
Specialty Products Company. "Rear Toe Adjustment Kit, 8550." Instructions. 2 pages.
Motor Auto Repair Manual, 42nd Ed. (1979) by Motor, New York, NY, pp. 1-232-1-232, see "1974-79 Corvette Rear Wheel Alignment" and Fig. 3, 2 pages.
Shim-A-Line, Inc, 1986 Wheel Alignment Catalogue, "Catalogue 31." Minneapolis, MN, 3 pages.
Specialty Products Company Catalogue No. 8500 (Feb. 15, 1985), p. 18, see product No. 85500.

* cited by examiner

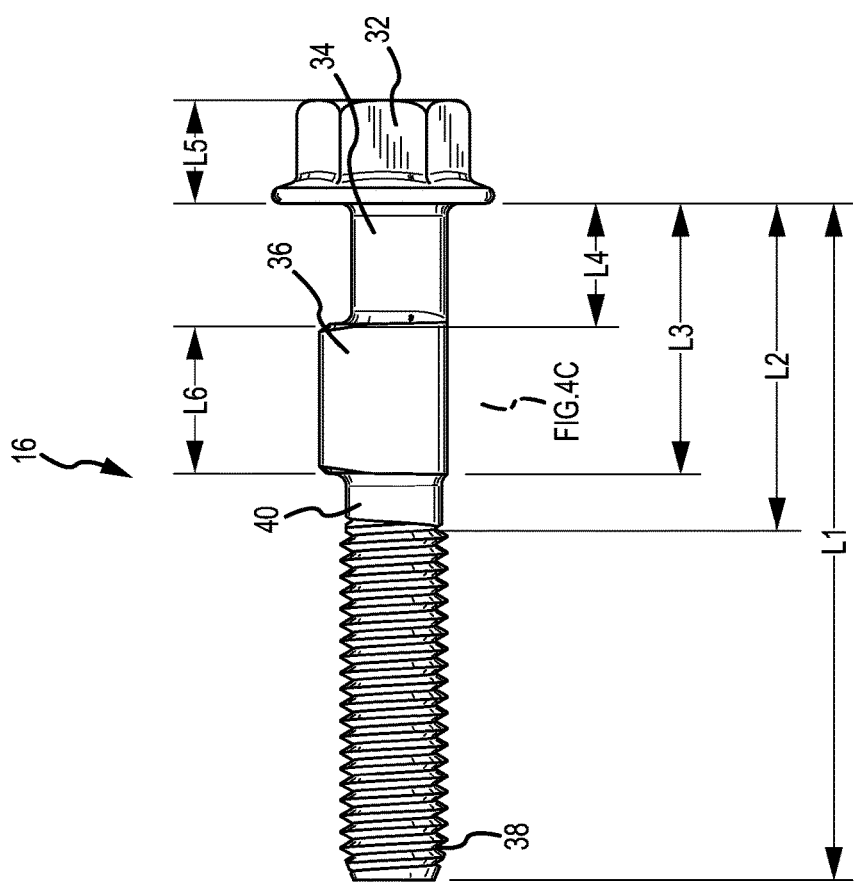

OFFSET WASHER FOR ADJUSTING CAMBER ANGLE

FIELD

The present disclosure relates generally to an apparatus for adjusting camber in a vehicle and, more specifically, to a washer used with a fastener apparatus for adjusting camber in a vehicle suspension system.

BACKGROUND

The camber angle, referred to simply as camber in the automotive trade, is the variance in degrees measured between true vertical and that of the measured vertical axis of the wheel as viewed from the front or back. Most vehicles are developed and produced with camber specifications recommended and published by the manufacturer. Camber, in combination with suspension design and other wheel alignment specifications, is developed to best meet a vehicle's handling and tire wear expectations. Many vehicles do not provide for a built-in method of adjusting camber. In other words, the wheel assembly may be securely attached to the suspension system, which may make adjusting the camber angle more difficult. In these vehicles, the arrangement may include a generally vertical suspension strut including a knuckle assembly operably connected to a lower portion thereof. The knuckle may then attach to a wheel spindle (which connects to the wheel). Although these vehicles may be made to have a non-adjustable camber angle, in order to keep a vehicle in specification for optimized handling and tire wear attributes camber may need to be adjusted from time to time. Bolts, cam-shaped washers, other fastener assemblies, and bolt holes ground into slots have been used to mechanically alter camber on vehicles with these "non-adjustable" suspension systems.

As illustrated in U.S. Pat. No. 8,544,861, which is herein incorporated by reference in its entirety, a bolt with a lobe and a corresponding offset washer can be used as adjustment of camber. However, such offset washers are manufactured by forming a tang within the offset washer. The tang is then deformed downward such that it is insertable into a receiving slot/hole on the knuckle strut or the like. Forming the tang this way causes the tang to be the same material thickness as the washer, since it is formed from the same material. Thus the ability to space the washer within the receiving slot/hole is limited to the thickness of the washer. Greater flexibility in spacing the offset washers within the receiving slot/hole is desirable. Such flexibility may allow for greater increases in the camber change during adjustments and/or for increases in fasteners achievable clamp load. These changes may decrease manufacturing costs and allow for simplified installation.

SUMMARY

The present disclosure relates to an offset washer for adjusting camber in a vehicle. The offset washer may be adjusting camber angle in a vehicle. The offset washer may include a body having an upper surface and a lower surface. The offset washer may include an aperture extending through the body. The offset washer may include a spacing protrusion having a longitudinal width different than the body thickness from the upper surface to the lower surface. The spacing protrusion may extend from the lower surface. The spacing protrusion may be configured to be inserted into a receiving aperture on a flange of a vehicle suspension system. The spacing protrusion may be defined by a step in the material along a portion of the edge of the aperture. The step in the material may be formed by upsetting the portion of the edge of the aperture when forming the aperture.

In accordance with various embodiments, the longitudinal width may be greater than the thickness from the upper surface to the lower surface. The longitudinal width may be less than the thickness from the upper surface to the lower surface. The offset washer may further include a fastener received through the aperture, with the fastener having a neck and a lobe along a length of the fastener. The neck may have a neck diameter that is smaller than the lobe having a lobe diameter. The longitudinal width may be approximately equal to the difference between the neck diameter and the lobe diameter. A lateral width of the spacing protrusion may be less than the width of the receiving aperture. A thickness of the protrusion may be approximately the same as the thickness from the upper surface to the lower surface. The aperture may be generally circular and the step in the material forms an oblong extension away from the circular aperture.

The present disclosure relates to an adjustment assembly for adjusting camber in a vehicle. The adjustment assembly may be adjusting camber angle in a vehicle. The adjustment assembly may include an offset washer having a body with an aperture extending through the body and a spacing protrusion having a lateral thickness different than the body thickness with the spacing protrusion extending from a lower surface of the body. The spacing protrusion may be configured to be inserted into a receiving aperture on a flange of a vehicle suspension system. The adjustment assembly may include an adjustment bolt. The adjustment bolt may include a head having a bottom surface. The adjustment bolt may include a neck extending eccentrically from the bottom surface of the head, and having a neck diameter and a first centerline. The adjustment bolt may include a lobe extending outward from the neck and being axially misaligned therewith, and having a lobe diameter and defining a second centerline. The adjustment bolt may include a threaded portion extending outward from the lobe. The first centerline and the second centerline may be different from one another.

In accordance with various embodiments, the lateral thickness may be greater than the difference between the lobe diameter and the neck diameter of the adjustment bolt. The lateral thickness may be less than the body thickness. The lateral thickness may be approximately equal to the difference between the neck diameter and the receiving aperture diameter. At least one face of the spacing protrusion may extend perpendicularly from the body of the washer. The neck of the adjustment bolt may be configured to contact the spacing protrusion. The receiving aperture defined in the suspension system may be larger than an adjustment aperture defined in a knuckle operably connected to a strut by the adjustment assembly. The receiving aperture defined in the suspension system may be located in a bracket that connects a control arm to a chassis. The adjustment bolt may pass through the aperture in the bracket and a pivot in the control arm. The spacing protrusion may be defined by a step in the material along a portion of the edge of the aperture. The step in the material may be formed by upsetting the portion of the edge of the aperture when forming the aperture such that the step is operable to occupy greater than 5% of the circumference around the washer aperture.

BRIEF DESCRIPTION OF THE DRAWINGS

FIG. 5B is a front elevation view of the adjustment bolt illustrated in FIG. 4 showing various dimensional features.

DETAILED DESCRIPTION

The present disclosure relates to an offset washer used in an adjustment assembly for adjusting the camber angle of a wheel assembly on a vehicle. The offset washer may be incorporated as part of an adjustment assembly that may be used to operably connect a knuckle supporting a wheel hub to a suspension strut. The offset washer includes a body having an upper surface and a lower surface, an aperture extending through the body, and a protrusion. The protrusion may have a longitudinal width different than the body thickness of the washer as measured from the upper surface to the lower surface. The protrusion is configured to be inserted into a receiving aperture on a flange of a vehicle suspension system. The protrusion may be operable as a spacing mechanism between the edge of the receiving aperture and another portion of the adjustment assembly such as a bolt. The protrusion may be formed by upsetting the material around the aperture, allowing for a variety of longitudinal widths to be selected. In this way, the longitudinal width of the protrusion can be different than the body thickness of the washer. Having a variable relationship between these two elements allows for greater flexibility when utilized with an adjustment bolt.

In accordance with various embodiments, the offset washer and the adjustment bolt may be utilized to adjust the camber angle of the vehicle wheel assembly. For example, the adjustment bolt may include any bolt such as those disclosed in U.S. Pat. No. 8,544,861, which is hereby incorporated by reference in its entirety. The adjustment bolt includes a head, a neck, a lobe or cam, and a threaded portion. The head and lobe may share a same centerline, whereas the threaded portion and the neck have different centerlines from each other and from the head and lobe. In other words, the lobe and head have a first centerline, the neck has a second centerline, and the threaded portion has a third centerline. Thus, the adjustment bolt has three separate centerlines or symmetry axes. As the adjustable bolt has three different centerlines, the major diameter of the threaded portion may stay within the outer diameter of the lobe. This allows for a single-size adjustable bolt to be used for multiple suspension systems with varying apertures.

Figure 1:
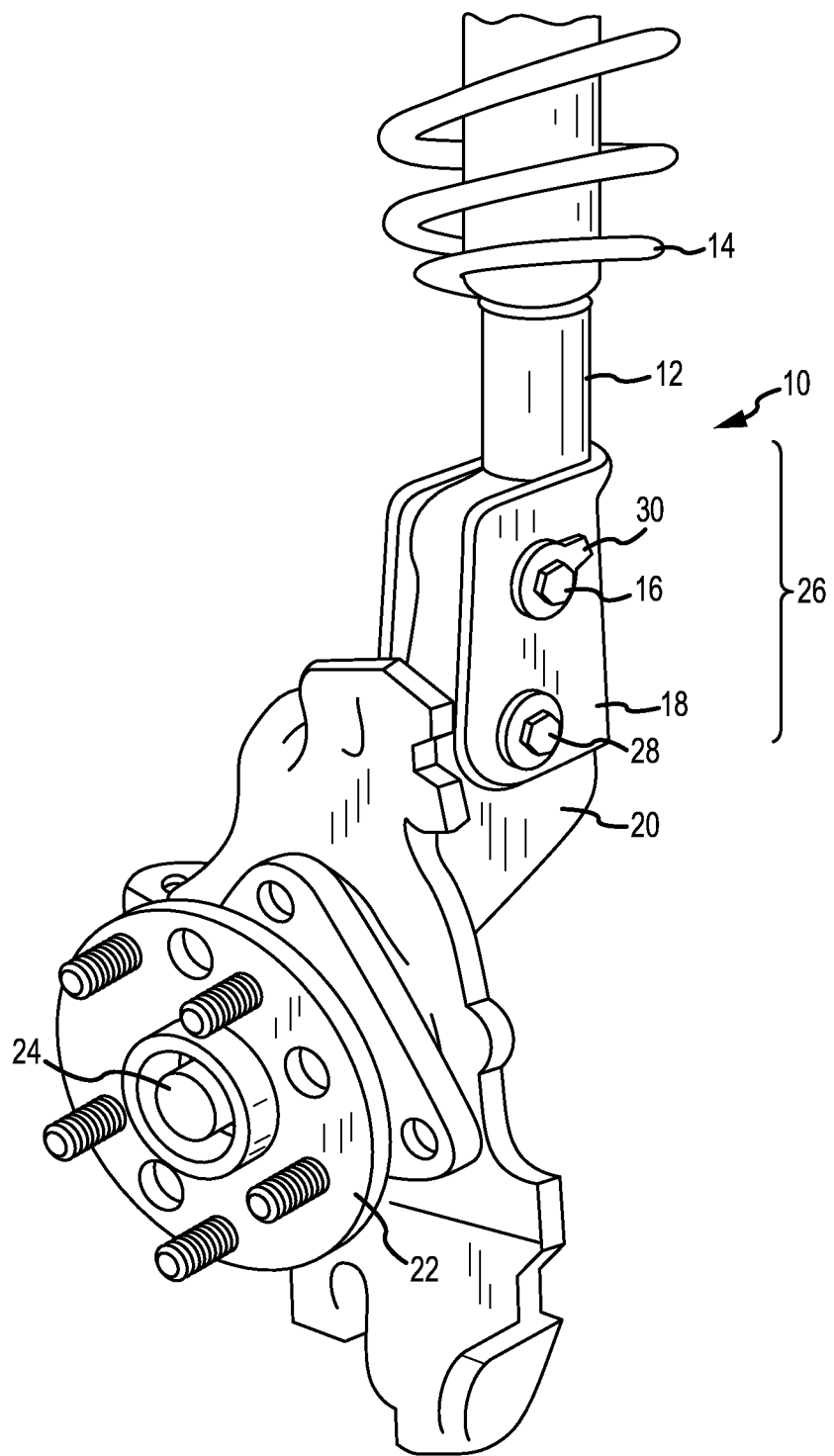
FIG. 1 is an isometric view of a portion of a vehicle suspension system including a suspension strut operably connected, via an adjustment assembly, to a knuckle assembly. The knuckle assembly is connected to a wheel hub.
Figure 2:
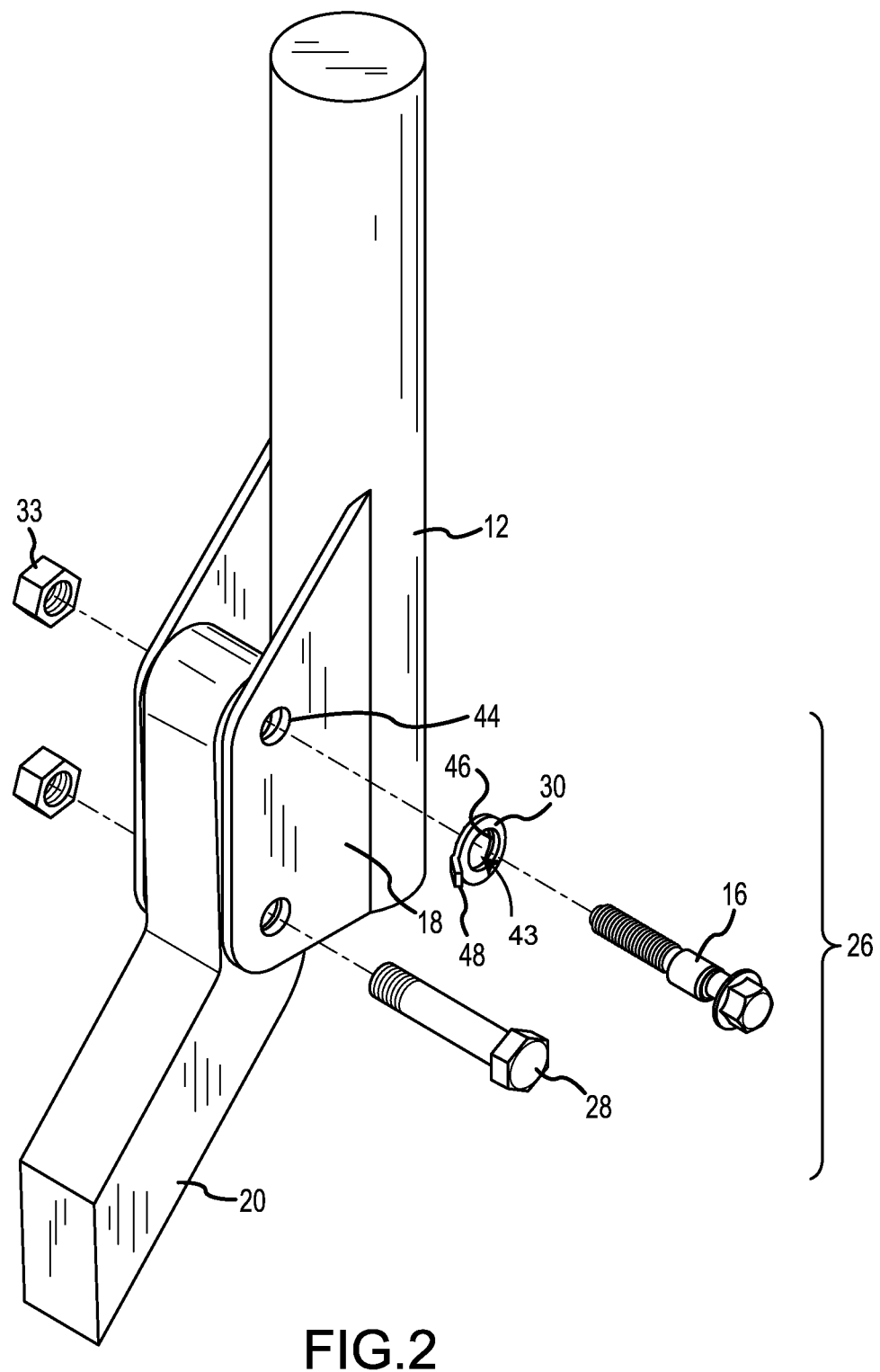
FIG. 2 is an exploded isometric view of the suspension strut, operably connected to a portion of the knuckle via the adjustment assembly.

FIGS. 1 and 2 are isometric views of a vehicle suspension system 10 (e.g. a strut system as shown here), which may include a suspension strut 12 operably connected via an adjustment assembly 26 to a knuckle assembly 20. The knuckle 20 is operably connected to a wheel hub 22. The suspension system 10 may be connected between a vehicle and a wheel assembly (not shown) of the vehicle. The suspension system 10 may be used to connect the wheel assembly to the vehicle as well as provide support and damping to control pitch and roll of the vehicles body/chassis. Secondary uses may include providing comfort for passengers within the vehicle by reducing shock from motion of the vehicle entering into the vehicle. The suspension system 10, illustrated in FIG. 1, is for a single wheel assembly of a vehicle and the other corners of the vehicle suspension are not shown. However, the other corners half of the suspension system may be essentially the same as the suspension system 10 illustrated in FIG. 1. The suspension system 10 includes a strut 12 and a spring 14 which are operably connected to the knuckle 20 via an adjustment assembly 26. The knuckle 20 may then be operably connected to a wheel hub 22 which may be mounted on a spindle 24.

The strut 12 and the spring 14 support the vehicle body while providing damping and control for the vehicle. The strut 12 may consist of a generally vertical cylindrical body and the spring 14 wraps around the outer surface of the strut 12. The adjustment assembly 26 operably connects to the strut 12 via a u-bracket 18 or flanges extending from the strut 12. For example, as shown in FIG. 1, the u-bracket 18 is inserted around a lower body of the strut 12, such that the strut 12 is surrounded on three sides. The u-bracket 18 receives an upper portion of the knuckle 20 and then an adjustment bolt 16 and a fastener 28 secure the knuckle 20 and u-bracket 18 to the strut 12. In some embodiments, the u-bracket 18 may be replaced by flanges extending from a lower portion of the strut 12 (see, e.g., FIG. 2). In these embodiments, the knuckle 20 may be inserted in between the two flanges, which substantially act as a u-bracket by utilizing the body of the strut 12 as the back portion. A wheel hub 22 may then connect to a spindle 24 extending from the knuckle 20. The wheel hub 22 operably connects to a wheel assembly (not shown) for the vehicle. It is contemplated that some vehicles have struts that do not include a spring. If these spring-less struts use two bolts to connect to the knuckle, then the bolt described herein is able to be utilized and performs the same or similar function. Both of adjustment bolts 16 and 28, or either, may be camber adjustment bolts as described herein.

The adjustment assembly 26 may be used to vary a camber angle of the wheel hub 22 (and wheel assembly) when it is connected to the knuckle 20. Camber is the variance in degrees measured between true vertical and that of the measured vertical axis of the wheel assembly (when viewed from the front or the rear of the vehicle). For example, if the top of a wheel assembly is farther away from the centerline of the vehicle than the bottom of the wheel assembly, the camber angle is positive. On the other hand, if the top of the wheel assembly is closer to the centerline of the vehicle than the bottom of the wheel assembly, the camber angle is negative. The camber angle may affect the handling qualities of a vehicle. For example, a negative camber angle may improve the grip of the tires while the vehicle is cornering. Camber angle directly affects handling and tracking of the vehicle as well as tire wear. Generally, adding more negative camber will improve handling, while positive settings will reduce these characteristics. If even tire wear is prioritized over handling, the adjustment assembly would be used to reduce camber closer to zero. Additionally, an excessive (e.g., too large) camber angle in either direction may increase tire wear, as well as impair handling. The adjustment assembly 26 alters the position of the knuckle 20 within the u-bracket 18 and with respect to the strut 12, so as to alter the camber angle.

FIG. 2 is an exploded view of the adjustment assembly 26 operably connecting the strut 12 to the knuckle 20. The adjustment assembly 26 includes an offset washer 30. The offset washer 30 may be engaged with an adjustment bolt 16 and a nut 33. The adjustment assembly 26 may also include a second fastener such as fastener/bolt 28. The fastener 28 operably connects one portion of the knuckle 20 to the u-bracket 18. The fastener 28 may be a bolt, screw, or any other fastening device that may securely fasten the knuckle 20 to the u-bracket 18. The fastener 28 may substantially prevent the knuckle 20 from rotating within the u-bracket 18. The fastener 28 may be operably connected to the knuckle 20 and the u-bracket 18 with a washer, nut or the like.

Figure 2A:
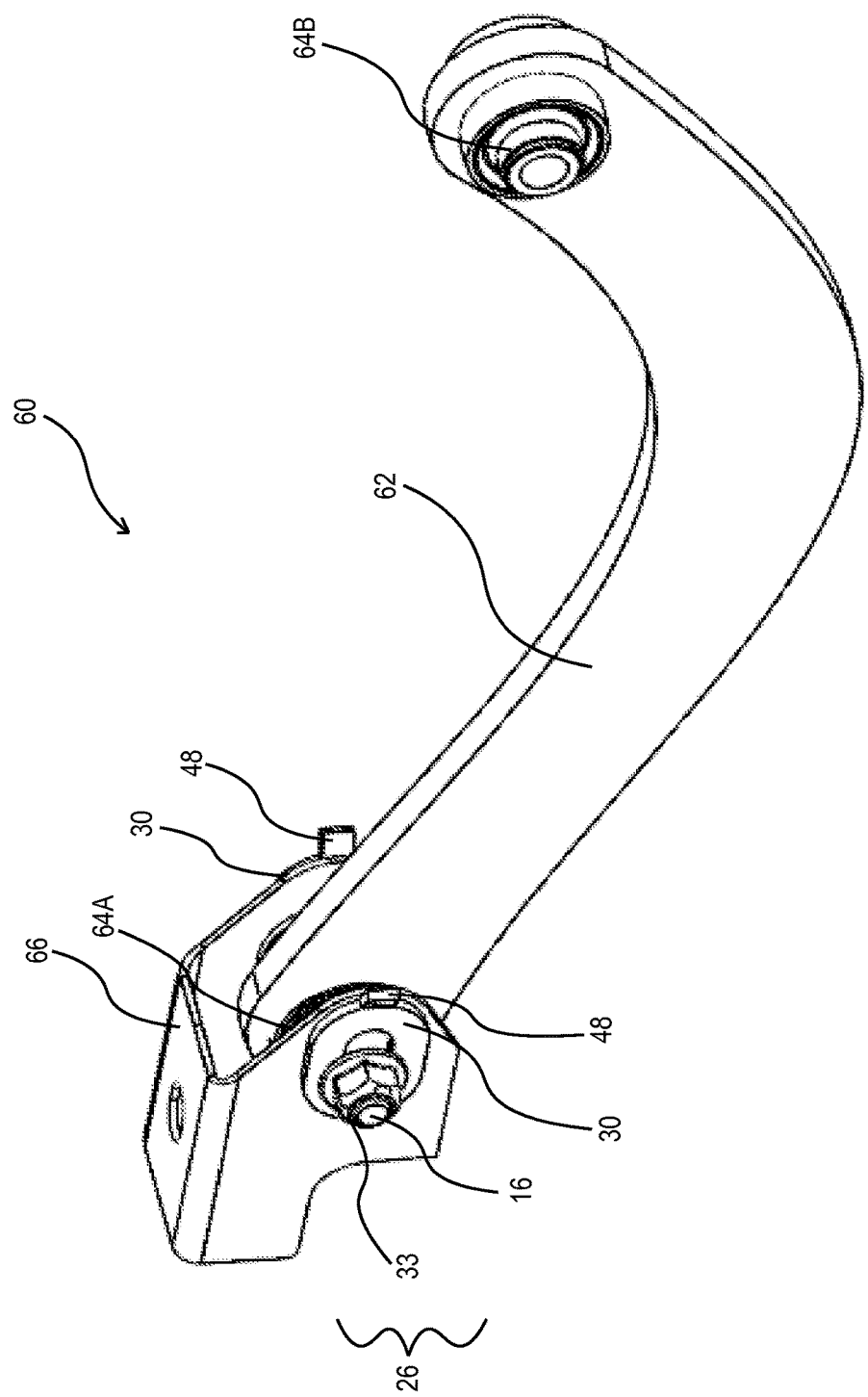
FIG. 2A is an isometric view of a control arm suspension assembly.
Figure 2B:
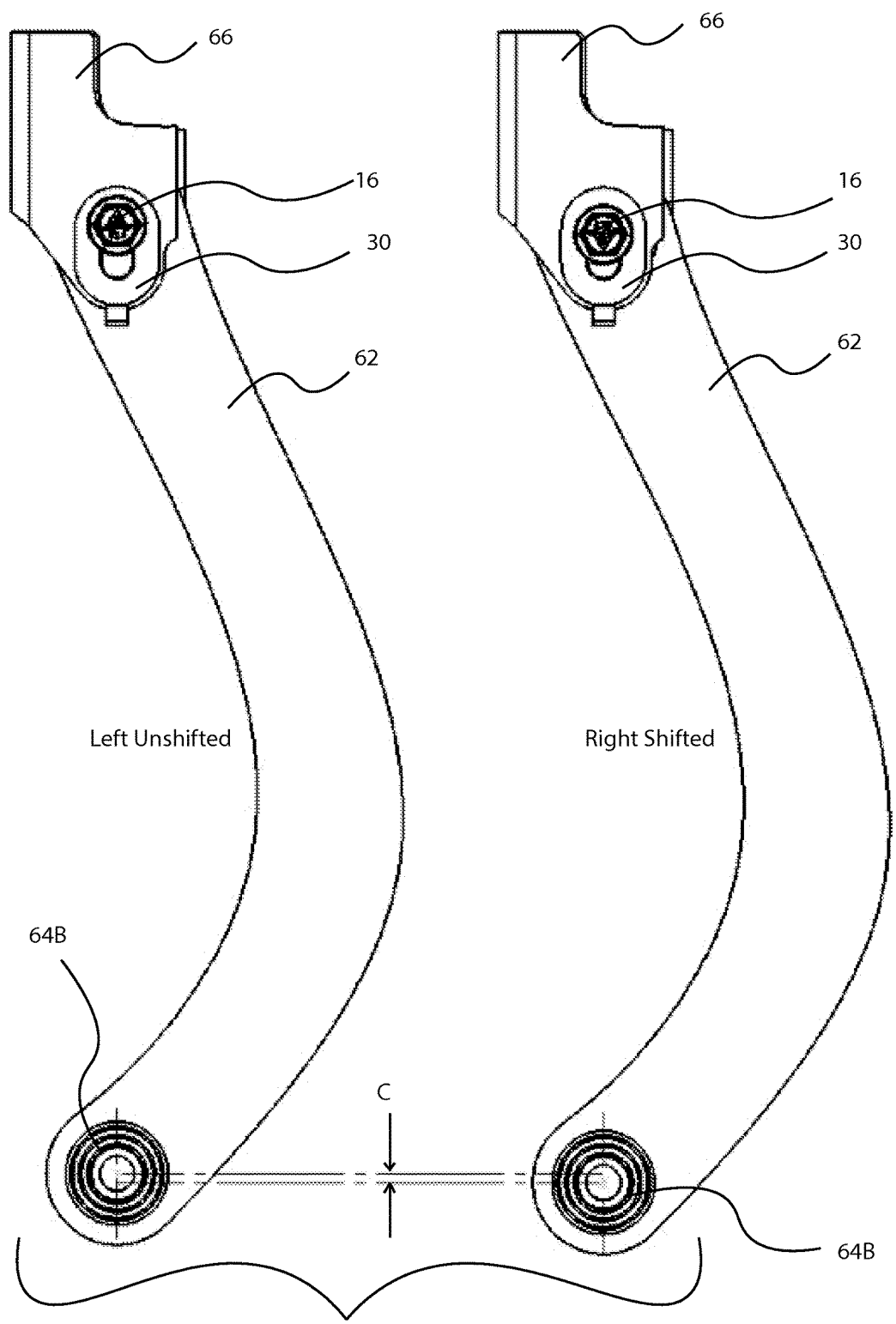
FIG. 2B is a side view of the suspension assembly of FIG. 2A in a first and second position.

In various embodiments, as illustrated in FIG. 2A-2B, the adjustment assembly 26 may be operable to adjust the positions of a control arm suspension 60. The control arms may connect a suspension bracket 66 to a knuckle assembly (not shown in FIGS. 2A-2B but generally known). Similar to the knuckle shown in FIGS. 1-2, the knuckle is operably connected to a wheel hub. The suspension system 60 may be connected between a vehicle and a wheel assembly (not shown) of the vehicle. The suspension system 60 may be used to connect the wheel assembly to the vehicle as well as provide support and damping to control pitch and roll of the vehicles body/chassis. Secondary may include those discussed above as well. The suspension system 60, illustrated in FIGS. 2A and 2B, is merely part of a single wheel assembly of a vehicle, with the remainder of the assembly and the other corners of the vehicle suspension not shown. However, the system may be likewise applicable to the other corners of the vehicle suspension. The suspension system 60 includes a bracket 66 and a pivot point 64A, a link arm 62 and a pivot point 64B, which is operably connected to the knuckle. The pivot point 64A may be connected to the bracket 66 via an adjustment assembly 26. While not shown, it may be appreciated that the knuckle may be operatively connected to the pivot point 64B via an adjustment assembly as well or as an alternative to the adjustment assembly 26 at pivot point 64A. The pivot points may be known suspension joints such as double shear joints that include for example heim joints or the like.

The adjustment assembly 26 operably connects the bracket 66 to the link arm 62 through the pivot point 64A. For example, as shown in FIG. 2A, the bracket 66 is positioned around the pivot point 64A. The bracket 66 includes two opposing holes operable to receive the adjustment bolt 16. The bracket 66 may be attached to or form a part of the frame, body, chassis, or similar structural portion of the vehicle. In some embodiments, the bracket 66 may be replaced by flanges extending from a structural portion of the vehicle (e.g. the frame, body, chassis or the like). The entire suspension assembly 60, of which only a part is shown, may include multiple link arms (e.g. one or more upper links or one or more lower links) connected at pivot points. Each link arm may include an adjustment assembly 26 or only one of the link arms may include the adjustment assembly 26.

The link arm 62 may extend away from the bracket 66 toward the wheel assembly mounted on the opposite pivot point 64B. Each link arm 62 may be connected at each of the ends of the link arm 62 to the vehicle and wheel assemblies. The connection may be made at the pivots 64A and 64B. For example, a bolt may extend through each of the pivots securing the connection. Either one or both of these bolts may be an adjustment bolt 16. The adjustment assembly 26 may be used to vary a camber angle of the wheel hub (and wheel assembly). In this embodiment, changing the position of the bracket 66 relative to the position of the top or bottom of a knuckle will change the camber on a vehicle. The adjustment assembly 26 alters the position of the pivot (e.g. 64A or 64B) by shifting the axis of the pivot relative to the through holes through the bracket 66. In accordance with various embodiments, the adjustment assembly 26 includes an adjustment bolt 16 and one or more offset washers 30. The various engagements between the adjustment bolt 16, the offset washer 30, the bracket 66, and the pivot 64 allow the position of the link arm 62 to be extended from the bracket 66 or retracted to the bracket 66. The lobed portion of the adjustment bolt 16, discussed below, may shift the pivot 64A or 64B as the adjustment bolt 16 is rotated. This change has the effect of positioning the knuckle in a different position relative to the bracket 66, so as to alter the camber angle. FIG. 2B illustrates this change. By rotating the adjustment bolt 16 the link arm 62 shifts a distance of C. The left image of the suspension assembly 60 in FIG. 2B shows the suspension assembly in a first position and the right image of the suspension assembly 60 in FIG. 2B shows the suspension assembly in a second position. The adjustment assembly 26 is operable to shift the assembly by a distance less than or equal to C.

As discussed herein, strut systems and control arm suspension systems are shown. These two systems merely represent different examples for which the various adjustment systems discussed herein are applicable and should not be considered the only systems to which the systems discussed herein are applicable.

Figure 3A:
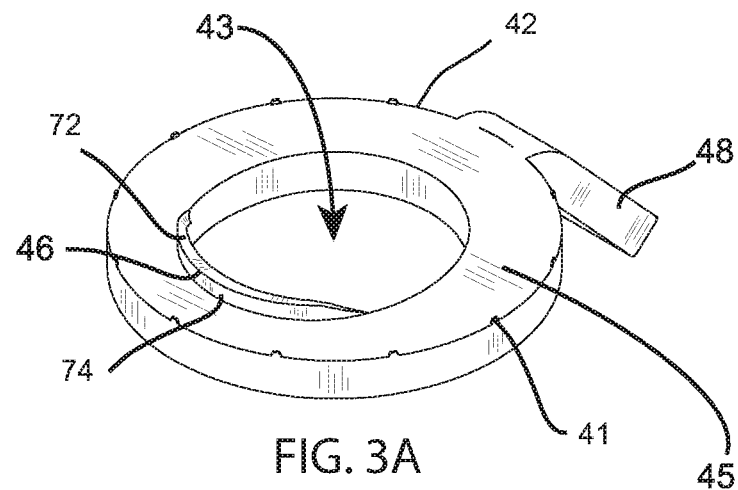
FIGS. 3A-3B are isometric bottom views of an offset washer.
Figure 3B:
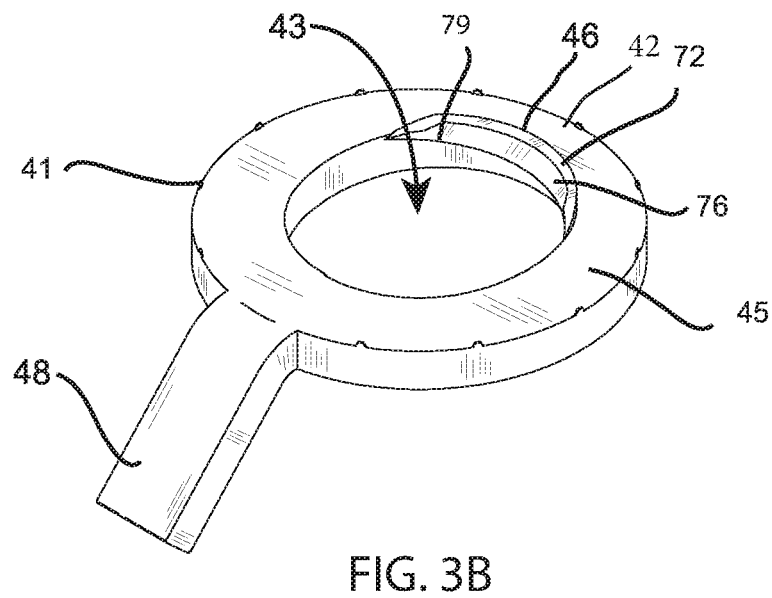

The offset washer 30 is used in combination with the adjustment bolt 16 to adjust the camber angle for the vehicle. As illustrated in FIGS. 3A-3O, the offset washer 30 may include a body 42 having an aperture 43 and a protrusion 46. In some embodiments, a tab 48 may extend from one side of the washer 30. For example, the tab may extend from the outside of the washer, with the aperture 43 extending through the interior of the washer. In various embodiments, one portion of the aperture 43 may be a through hole. A second portion of aperture 43 may not extend all the way through the washer 30. The second portion of the aperture 43 may be defined by protrusion 46.

The offset washer 30 may have an upper surface 49 (see e.g. FIGS. 3C and 3D) and a lower surface 45 (see e.g. FIGS. 3A and 3B) which define the material thickness of the washer 30. As shown in FIGS. 3A, 3B, 3E, 3G, and 3H the protrusion 46 may extend below the bottom surface 45. The protrusion may include a leading edge or surface 74, a bottom surface or edge 72, and/or an interior surface or edge 76. As discussed in more detail below, the interior surface or edge 76 may be configured to contact the neck 34 of adjustment bolt 16. The leading edge or surface 74 may be configured to fit within and/or engage the edges of the receiving aperture 44. The receiving aperture 44 may be located on any structural connection between suspension components and the vehicle or the wheel assemblies. For example, the aperture 44 may be through the u-bracket for a strut assembly or the mounting bracket for a control arm assembly or the like.

Figure 3C:
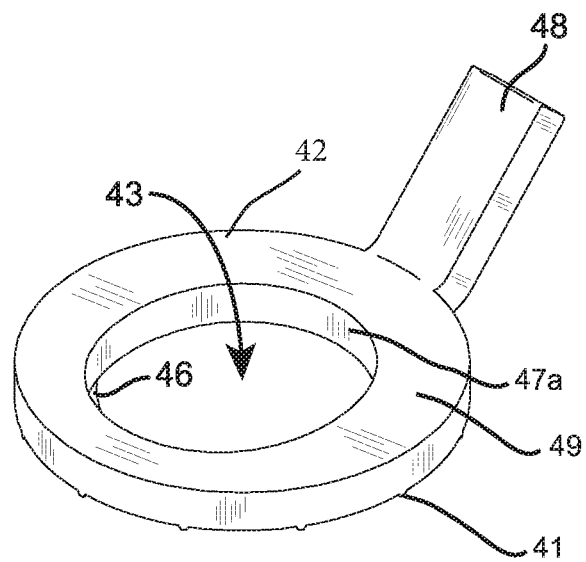
FIGS. 3C-3D are isometric top views of an offset washer.
Figure 3D:
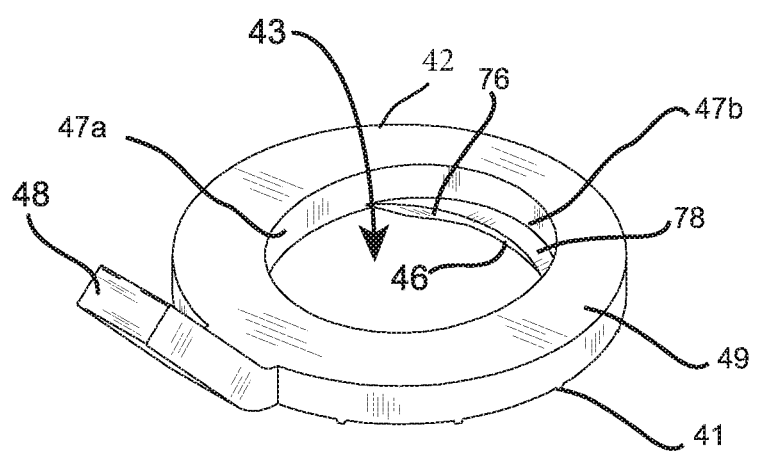
Figure 3E:
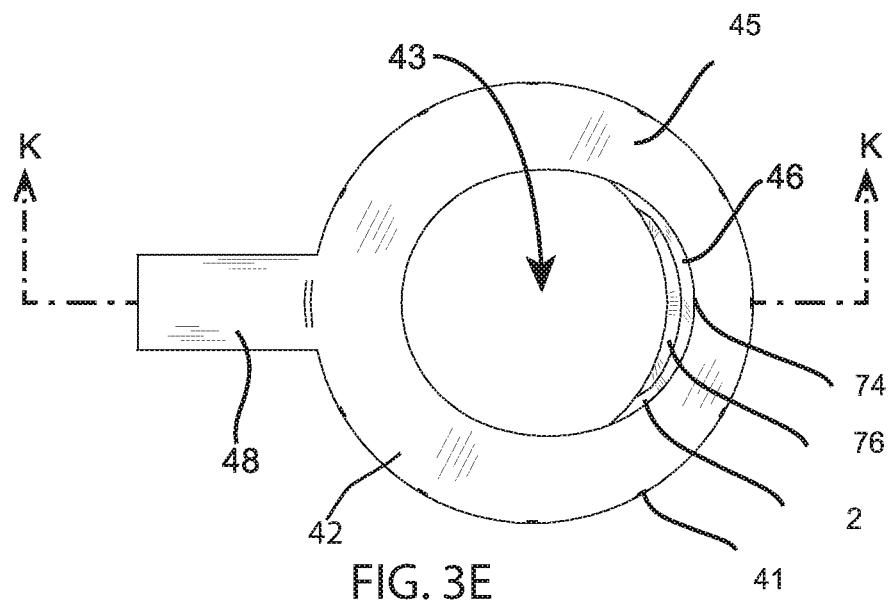
FIGS. 3E-3F are bottom and top views respectively of an offset washer.
Figure 3F:
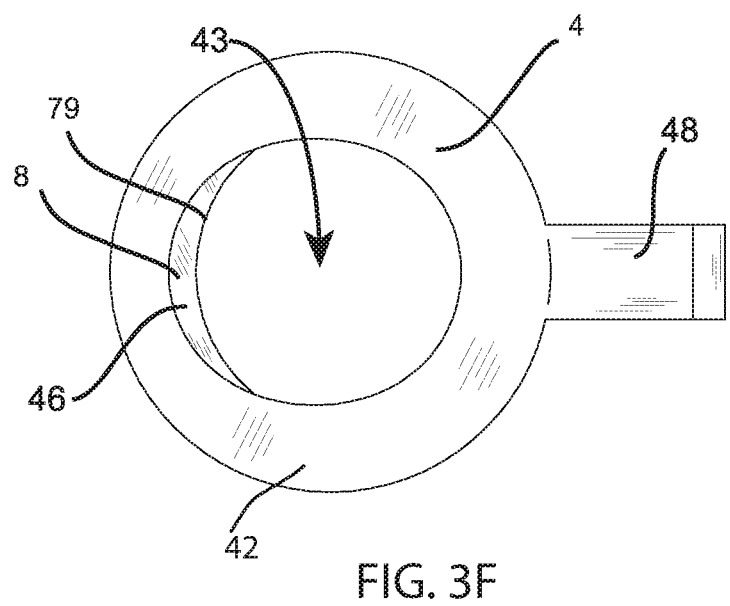
Figure 3G:
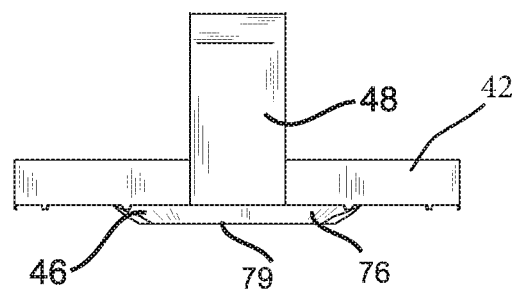
FIGS. 3G-3H are front and rear views respectively of an offset washer.
Figure 3H:
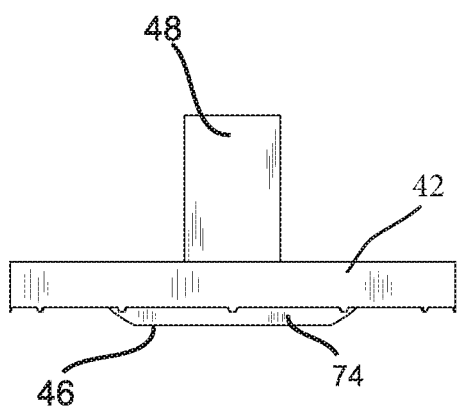

As shown in FIGS. 3C, 3D, and 3F the protrusion 46 may be formed as an upset around at least a portion of the aperture 43. To form the upset, the wall 47a may be sheared to form a new wall portion 47b. In this way, the top surface 49 of the washer may be shifted down along the side of the new wall portion 47b forming a protrusion top surface 78. By forming an upset around the aperture 43, the aperture 43 may be a generally round through hole with the upset forming an oblong portion of the aperture 43 that does not form a through hole but instead forms the protrusion 46 adjacent to the through hole.

The protrusion 46 may be inserted around a portion of the adjustment bolt 16 and placed within a receiving aperture 44 in the u-bracket 18. The protrusion 46 helps position the adjustment bolt 16 in a proper location within the receiving aperture 44.

It should be noted that the washer 30 is shown as, generally, circularly shaped, but that the washer 30 or just the inner diameter thereof may be non-circularly shaped. In various embodiments, the aperture 43 may conform to or be of a similar shape as the largest member of the adjustment bolt 16 passing there through (see e.g. lobe 36 described in more detail below).

Extending on an opposite side of the offset washer 30 is a tab 48. The tab 48 may extend away from a main body of the washer 30 at a slight angle, so that when the washer 30 is placed against the outer surface of the u-bracket 18, the tab 48 extends away from an outer surface of the u-bracket 18. The tab 48 more easily allows a user to fit the protrusion 46 within the receiving aperture 44 in order to best position the adjustment bolt 16 and washer 30 within the receiving aperture 44 for the direction of change as desired.

The bottom 45 of the washer 30 may include one or more cleats 41 extending therefrom. The one or more cleat(s) 41 may be positioned around the outer perimeter of washer 30. The cleats 41 may be operable to engage with the u-bracket 18 to limit the tendency of the washer 30 to rotate when in use.

Figure 3I:
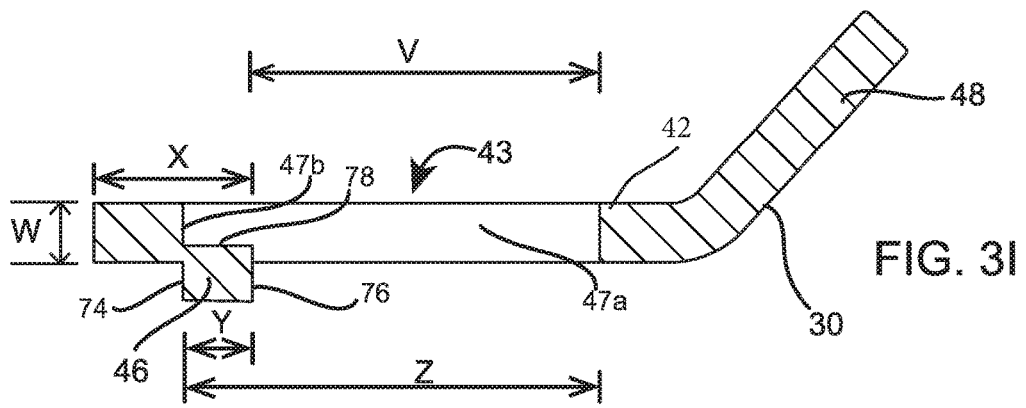
FIGS. 3I-3K are cross-section views of an offset washer taken through K-K of FIG. 3E.
Figure 3J:
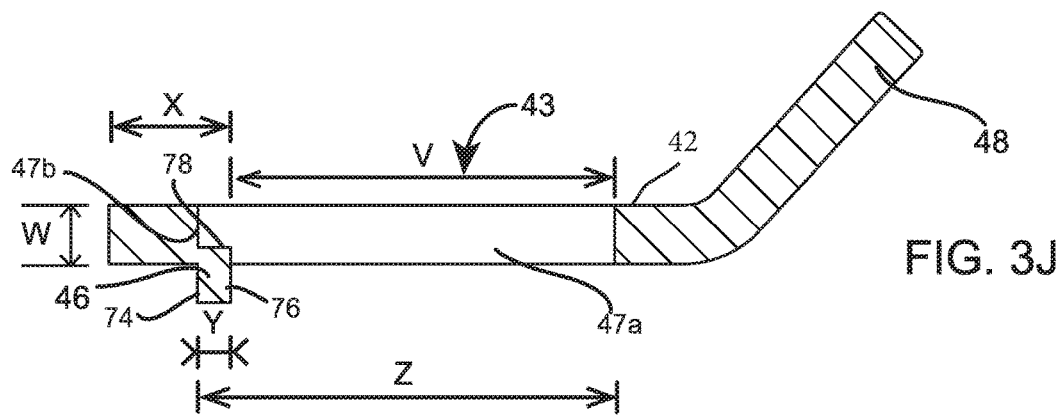
Figure 3K:
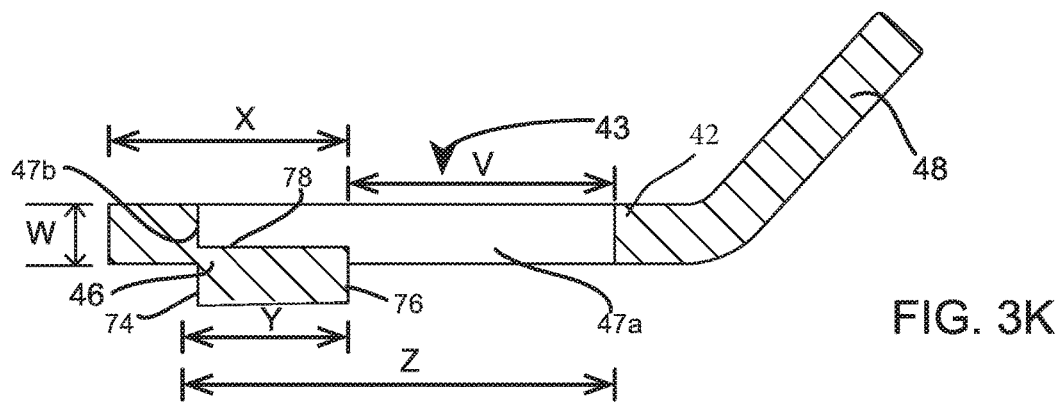

As shown in FIGS. 3I-3K, the protrusion 46 may be variable in width Y. As the protrusion 46 may be formed with an upset of the edge of aperture 43, the width Y of this upset may be formed from the rim of the washer 30 to any width less than the washer's rim width X. In various embodiments and as shown in FIG. 3J, the width Y may be less than the washer width W. In such an embodiment, the aperture diameter V may be maximized relative to the rim width X and/or the protrusion width Y. This may allow the diameter of the lobe 36 of the adjustment bolt 16 to be maximized, while maintaining a protrusion below the bottom surface 45 of the washer 30. In accordance with various embodiments, V may be held constant (at least relative to the diameter of the lobe 36 of the adjustment bolt 16), while X, Y, Z, and the offset distance 74 may be adjusted relative to the designed characteristics such as bolt strength, neck thickness, and amount of offset.

The minimum limitations of the width Y of the protrusion 46 are limited by the capability of the upsetting process, as one of ordinary skill in the art understands. As such, while the width Y may not be able to approach zero, it may be significantly less than the thickness of the washer 30 as measured from the top surface 49 to the bottom surface 45. In one embodiment, the thickness may be from about ½ the thickness of the washer 30 to about ¾ the thickness of the washer 30.

In various embodiments, the protrusion 46 may be formed by creating a step in the material, which may be formed by upsetting the portion of the edge of the aperture when forming the aperture. The step is operable to occupy 5-100% of the circumference around the washer aperture or more particularly 25-75%. However, in some embodiments, the protrusion 46 and the step defining it may be made by a process other than upsetting the material, for example it may be formed by machining the part, casting the part, welding the protrusion the washer or another similar process.

In various embodiments and as shown in FIG. 3K, the width Y may be greater than the washer width W. In such an embodiment, the size of the protrusion may be maximized relative to the size of the washer 30. For example, the protrusion 46 may be maximized relative to the rim width X. This may allow the protrusion to occupy a larger portion of or all of the gap in the receiving aperture 44 between the neck 34 and the edge of aperture 44, thereby allowing use of a smaller diameter neck 34 providing the same or greater adjustment as compared to a protrusion 46 having a width Y similar or the same as the washer thickness W. The maximum limitations of the width Y of the protrusion 46 are limited by the width X of the washer's rim. The protrusion width Y may be significantly more than the thickness of the washer 30 as measured from the top surface 49 to the bottom surface 45. In various embodiments, the width Y may be from about 1 and ½ times the thickness of the washer 30 to about 5 times the thickness of the washer 30. More particularly, the width Y may be from about 2 times the thickness of the washer 30 to about 3 times the thickness of the washer 30. In accordance with one embodiment, the width Y may be approximately the same as the maximum distance between the outer diameter of the lobe 36 and the outer diameter of the neck 34 of the adjustment bolt 16.

In various embodiments, thickness of the protrusion 46 is approximately the same as the thickness from the upper surface to the lower surface of the washer 30. The offset distance (i.e. the height of 74) may not be able to approach the thickness of the washer; it may be slightly less than the thickness of the washer 30 as measured from the top surface 49 to the bottom surface 45. In various embodiments, the offset distance may be from about 20% the thickness of the washer 30 to about 80% the thickness of the washer 30. More particularly, in various embodiments, the offset distance may be from about ½ the thickness of the washer 30 to about ¾ the thickness of the washer 30.

Figure 4:
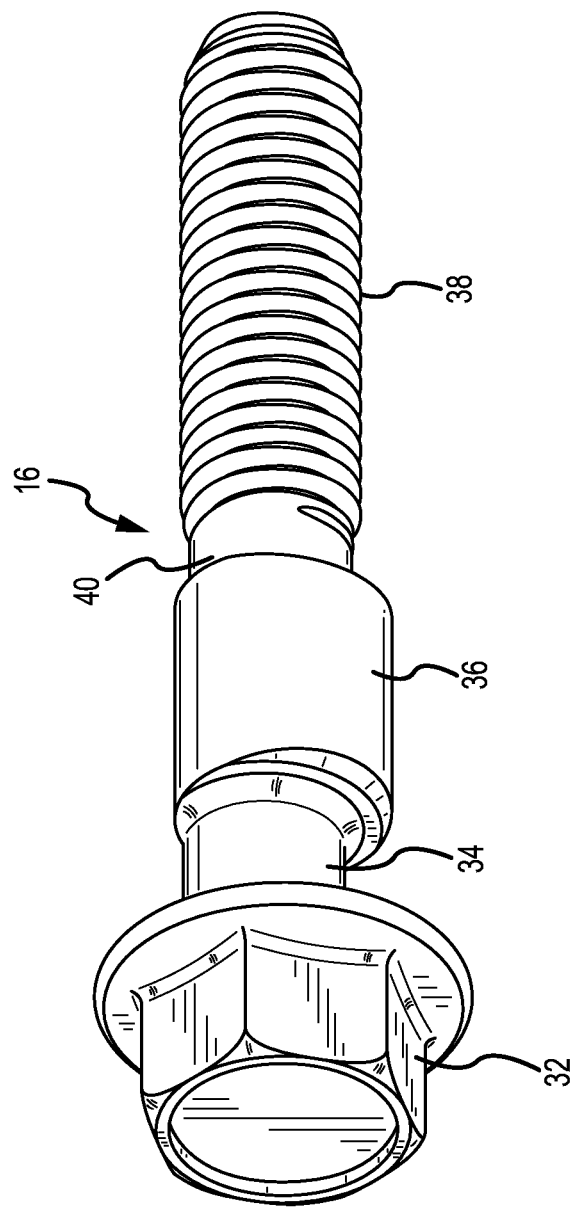
FIG. 4 is an isometric view of an adjustment bolt forming a part of the adjustment assembly illustrated in FIGS. 2 and 2A.
Figure 5A:
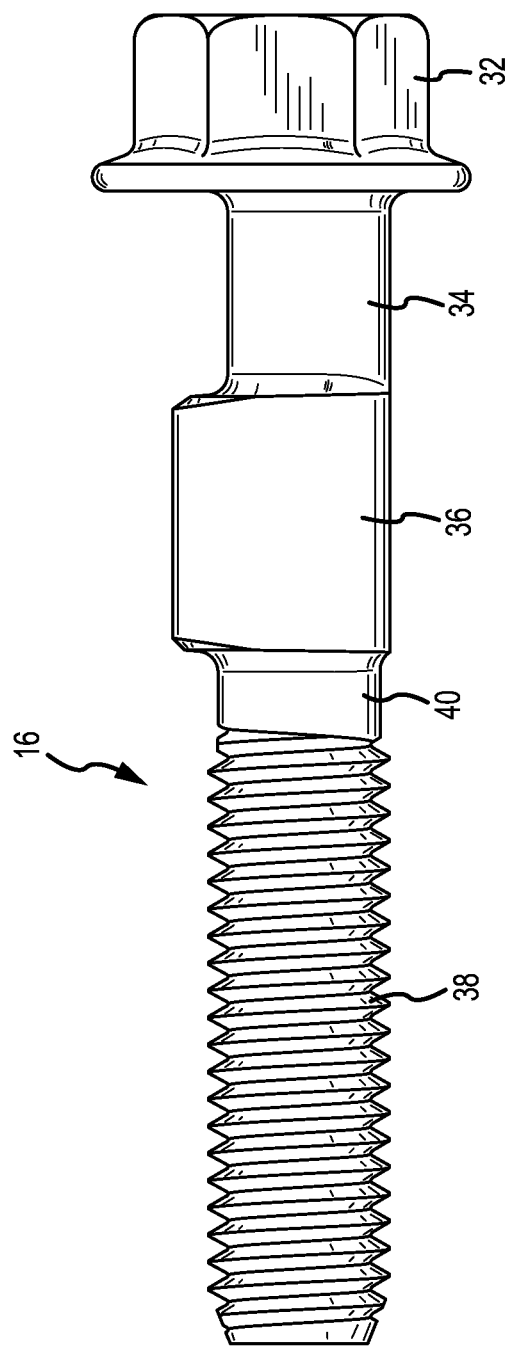
FIG. 5A is a front elevation view of the adjustment bolt illustrated in FIG. 4.
Figure 5C:
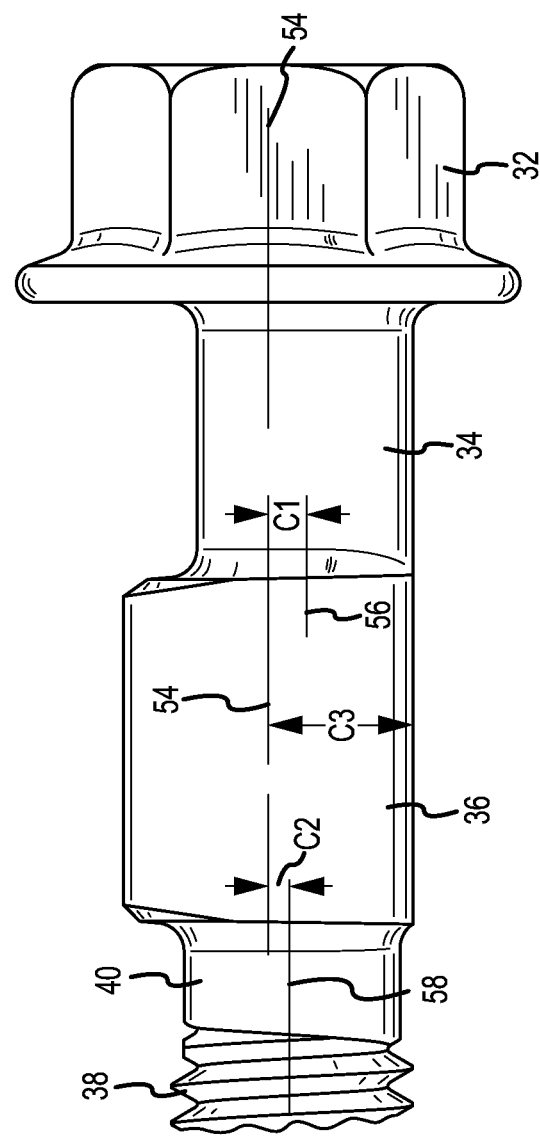
FIG. 5C is an enlarged rear elevation view of a head, neck and lobe of the adjustment bolt illustrated in FIG. 5B.

Disclosed herein is an example of an adjustment bolt that may be utilized with the offset washer discussed above. FIG. 4 is an isometric view of the adjustment bolt 16, FIG. 5A is a front elevation view of the adjustment bolt, FIG. 5B illustrates dimensional features of the adjustment bolt 16, and FIG. 5C is an enlarged rear view of a portion of the adjustment bolt 16 illustrated in FIG. 5B. The adjustment bolt 16 includes a head 32, a neck 34, a lobe 36 or cam, a threaded portion 38, and a transition portion 40. The adjustment bolt 16 is configured to be inserted into the receiving apertures 44 on the u-bracket 18 and held in place via the offset washer 30 and a nut 33. The adjustment bolt 16 extends through the receiving apertures 44 and an adjustment aperture 50 (see, e.g., FIGS. 10A and 10B) on the knuckle 20. A part of each of the neck 34, the lobe 36 and the threaded portion 38 are retained within the adjustment aperture (such as aperture 50 in FIG. 10A), and then the threaded portion 38 extends out past the second receiving aperture 44 and the nut 33 is secured around the exposed threaded portion 38. The adjustment bolt 16 may be steel, steel alloy (e.g., 4140 steel, 5140 steel), or other materials with similar properties.

Referring to FIGS. 5A and 5B, the head 32 is configured to provide a gripping surface for a wrench, pliers, or other similar tightening or adjusting tools to allow the adjustment bolt 16 to be rotated within the adjustment aperture 50 and receiving apertures 44. Thus, the head 32 may include a faceted or hexagonal shaped body. The body then expands outwards to form a plate. The plate, also referred to commonly as a flange, is configured to rest along an outer surface of the offset washer 30 when the adjustment bolt 16 is operably connected to the strut 12. The head 32 has a length L5 (FIG. 5B) measured from a bottom surface of the plate to the front surface of the body. The length L5 is essentially the thickness of the head 32 and may be varied to accommodate differently-sized adjustment tools, as well as differently-sized receiving apertures 44. In some embodiments, the head 32 may be replaced with a bolt head and generally circular or other shaped washer. In these instances, the plate may be a separate washer that may be operably connected to the bolt 16.

Referring generally to FIGS. 5A-5C, after the head 32, the adjustment bolt 16 transitions into the neck 34. The neck 34 extends eccentrically from a bottom surface of the plate 53 and has a smaller diameter then the plate 53. The neck 34 includes a length L4 that in some embodiments may range between approximately 11.2 mm (0.44 inches) and 12.6 mm (0.49 inches). However, it should be noted that the neck 34 length L4 may be any dimension, as long as the lobe 36 may be positioned within the receiving aperture 44 and still be within the adjustment aperture 50. Additionally, the neck 34 has a neck centerline 56. The neck centerline 56 is located at a different position from the head centerline 54. The neck centerline 56 is located at a distance C1 below the head centerline 54. The distance C1 between the neck centerline 56 and the head centerline 54 may range between approximately 1.02 mm (0.04 inches) and approximately 1.55 mm (0.061 inches). In this manner, the center or symmetry axes of the head 32 and the neck 34 are aligned different from one another, such that the neck 34 may be eccentrically aligned with respect to the head 32.

The lobe 36 extends eccentrically outwards from a bottom right surface of the neck 34. The lobe 36 is eccentrically aligned with the neck 34 such that along a right surface the head 32, the neck 34 and the lobe 36 intersect at a same plane. The lobe 36 has a larger overall diameter than the neck 34, the transition region 40 and the threaded portion 38. The lobe 36 has a length L6, and the length L6 may be larger than the length L4 of the neck 34. For example, in some embodiments the length L6 may be approximately 0.55 inches and the length L4 may be approximately 0.45 inches. However, in other embodiments, both the length L6 and the length L4 may be approximately 0.50 inches; and furthermore, the lobe length L6 may be shorter than the neck 34 length L4.

The combination of the lobe 36 and the neck 34 has a length L3, measured from an end of the lobe 36 to the bottom surface of the plate. In some embodiments, the length L3 may be approximately 1 inch. However, this length L3 may be any dimension as long as the length L3 is approximately less than a length of the adjustment aperture 50 (e.g., a thickness of the knuckle 20) plus the thickness of the receiving apertures 44. This may help to ensure that the lobe 36 may not become engaged with the second receiving aperture 44 (on the opposite side of the u-bracket 18), which could prevent the adjustment bolt 16 from adjusting the camber. The lobe 36 and the head 32 have the largest diameters of the adjustment bolt 16. The lobe 36 has a lobe centerline or axis, and this centerline 54 is equal to the head 32 centerline 54. In other words, the lobe 36 and the head 32 are positioned, with respect to one another, such that the same bisecting line may intersect halfway between the head 32 and the lobe 36. The lobe 36 then decreases in diameter to form the transition region 40, which then expands to form the threaded portion 38. The transition region 40 extends from a right bottom surface of the lobe 36 such that the transition region 40 is eccentrically aligned with the lobe 36.

The lobe 36, the neck 34 and the transition region 40 have a length L2, measured from the beginning of the threads forming the threaded portion 38 to the bottom surface of the plate. The length L2 may be designed such that the adjustment bolt 16 may extend past the u-bracket 18 far enough to allow the nut 33 to be secured to the adjustment bolt 16. Finally, the adjustment bolt 16 has a length L1 as measured from the bottom surface of the adjustment bolt 16 (i.e., the end of the threaded portion 38) to the bottom surface of the plate. This length L1 may be altered to accommodate a different size strut 12, u-bracket 18, and/or knuckle 20. The length L1 may determine the percentage or portion of the adjustment bolt 16 that extends outwards past the second receiving aperture 44 within the u-bracket 18.

Figure 6A:
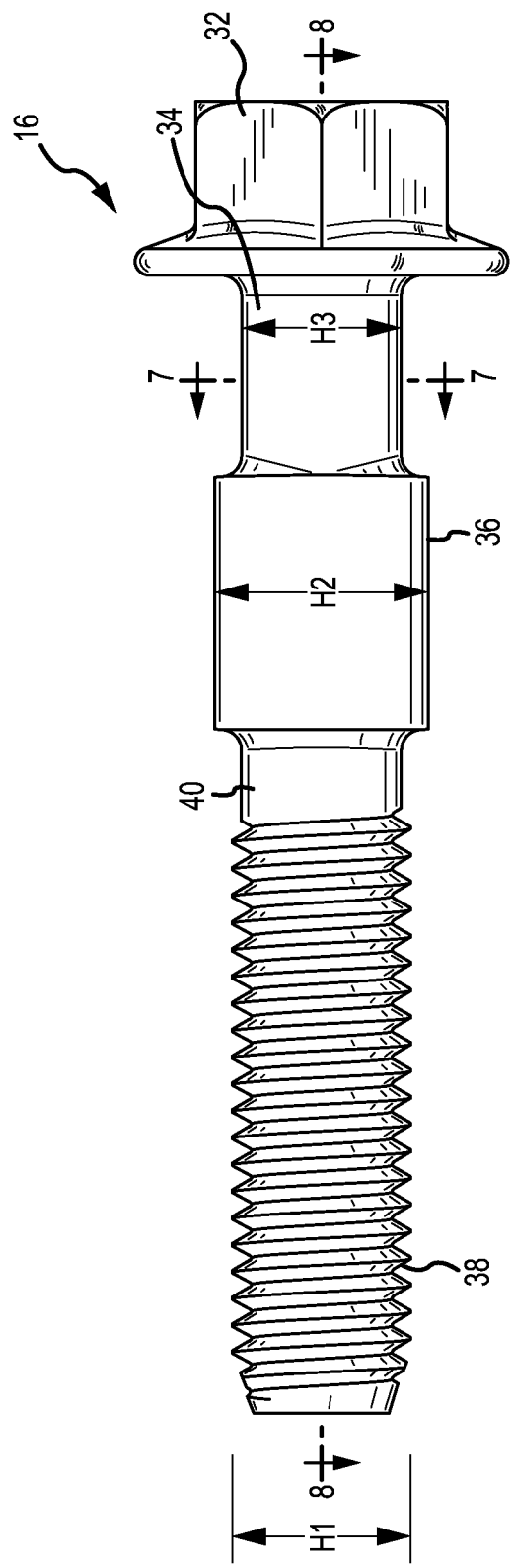
FIG. 6A is a right side elevation view of the adjustment bolt illustrated in FIG. 4.
Figure 6B:
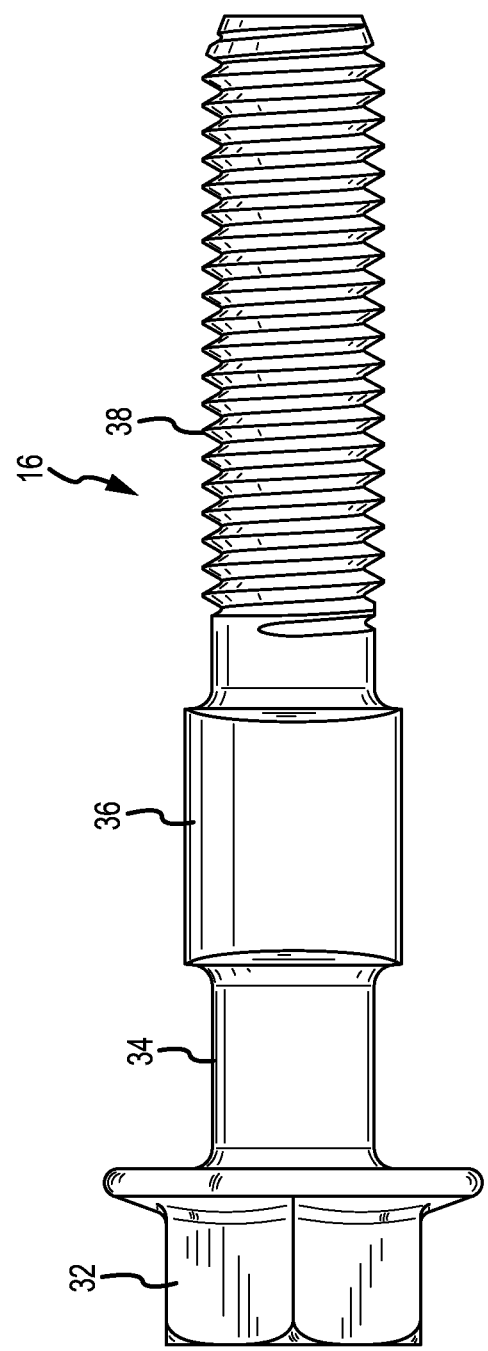
FIG. 6B is a left side elevation view of the adjustment bolt illustrated in FIG. 4.

FIG. 6A is a right elevation view of the adjustment bolt 16 and FIG. 6B is a left elevation view of the adjustment bolt 16. The neck has a diameter H3, the lobe has a diameter H2, and the threaded portion 38 has a diameter H1. As used herein, the word diameter is contemplated to mean the major axis of an object with a circular periphery, as well as the major axis of an object that does not have a circularly periphery, such as an oval or ellipse. As can be seen in FIG. 6A, each diameter H1, H2 and H3 may be different. For example, in one embodiment, H1 may be approximately 0.30 inches, H2 may be approximately 0.470 inches, and H3 may be approximately 0.351 inches. However, in other embodiments, the diameters H1, H2, H3 may have different dimensions, as long as H2 remains the largest, H1 remains the second largest and H3 is the smallest, comparatively. In one example, it should be noted that the height H3 of the neck 34 does not have to be smaller than H1 of the threaded portion 38; however, in most embodiments it typically may be smaller. As long as the neck 34 is strong as or stronger than the threaded portion 38, the diameter of the neck 34 H3 may be any size as compared with the diameter of the threaded portion H1. To enhance the potential for change to a large extent without 'wasting', or not efficiently using, space for neck size that cannot add strength, the neck diameter may be the same as the thread minor diameter so that strength will be roughly equivalent or the same. This allows a significantly increased practical difference in diameters H2 (lobe) and H3 (neck). When matched with a washer protrusion having a lateral thickness that is roughly equal to that difference, this arrangement may deliver a significantly enhanced level of change.

Referring to FIGS. 5C and 6A, the varying heights or diameters H1, H2, H3 of the neck 34, the lobe 36 and the threaded portion 38, as well as the eccentric alignment of each the head 32, the neck 34, the lobe 36 and the threaded portion 38, contribute to the varying centerlines 54, 56, 58 for each the neck 34, the lobe 36 and the threaded portion 38. The head 32 and the lobe 36 have the same centerline 54, the neck 34 has neck centerline 56 and the threaded portion 38 (and transition region 40) has a thread centerline 58. It should be noted that in some instances the head 32 may define a centerline that may be coaxial with any of the centerlines of the lobe 36, neck 34, and/or threaded portion 38, or the head 32 may have a centerline that is offset from two or all of the other centerlines. In other words, although as shown in FIG. 5C the head 32 may have the same centerline as the lobe 36, in other embodiments the head 32 may have a fourth centerline (different from the neck 34, lobe 36, and threaded portion 38), or the head 32 may have a centerline that is the same as the neck 34 or threaded portion 38.

The adjustment bolt 16 thus has three centerlines 54, 56, 58, and each centerline is different. For example, the head 32 and lobe 36 centerline 54 is spaced apart from the neck centerline 56 by a distance C1. This distance C1 may range between approximately 1 mm (0.039 inches) and approximately 1.55 mm (0.061 inches) and may be determined by the desired range of camber adjustment, and/or strength of the adjustment bolt 16 relative to the original bolt. Additionally, the head 32 and lobe 36 centerline 54 is spaced apart from the thread centerline 58 by a distance C2. This distance C2 is less then C1, such that the diameter H1 of the threaded portion 38 is flush to the neck 34. Note that the preceding is an example only. The benefits of a 3-axis bolt configuration as described herein is that C2 would be less than C1 by an amount that, when all edges stay on a 'common plane', the thread strength is matched to the neck strength by making the thread minor diameter match the neck diameter.

The three different centerlines 54, 56, 58 allow the adjustment bolt 16 to have an increased range of movement, as compared with other bolts. These centerlines increase the range of movement that the adjustment bolt 16 may provide to the knuckle 20 within the u-bracket 18. This is because the movement that the adjustment bolt 16 provides to the knuckle 20 may be a function of an offset between the neck 34 and lobe 36 centerlines 54, 56, as well as the "slop" in the receiving apertures 44 of the u-bracket 18 and/or the adjustment aperture 50 in the knuckle 20. The ability of the adjustment bolt 16 to fit a large C1 centerline offset distance into a given receiving aperture 44 and/or adjustment aperture 50 allows the adjustment bolt 16 to provide a greater camber range for a given suspension system. This additional range may occur if the 3-axis' lobe size is enlarged to include the portion of the 2-axis' thread that was over-flush to the original lobe size.

Figure 7A:
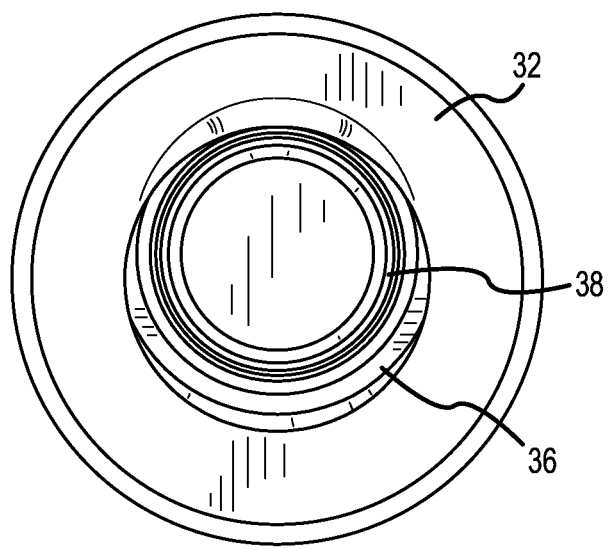
FIG. 7A is a bottom plan view of the adjustment bolt illustrated in FIG. 4.
Figure 7B:
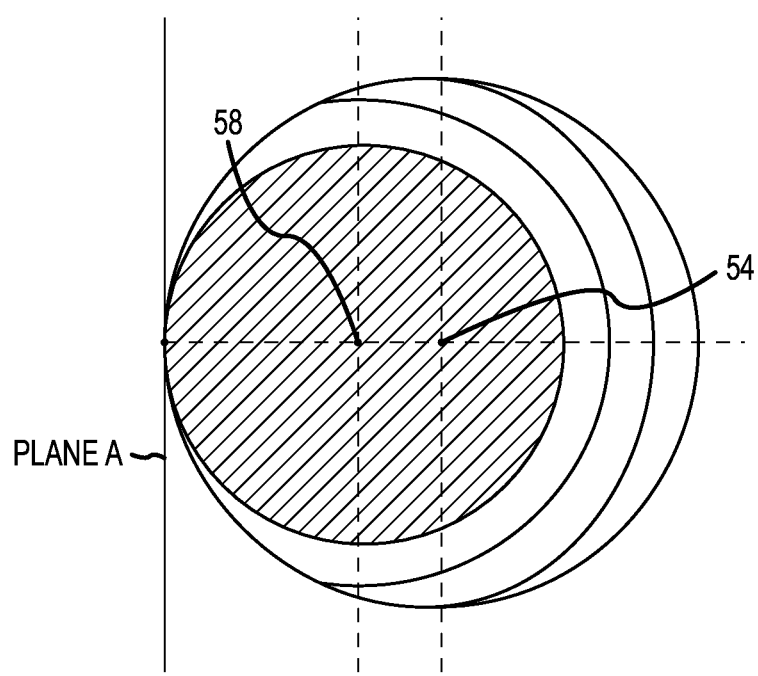
FIG. 7B is a cross-section view of the adjustment bolt illustrated in FIG. 4, viewed along line 7-7 in FIG. 6A.
Figure 8:
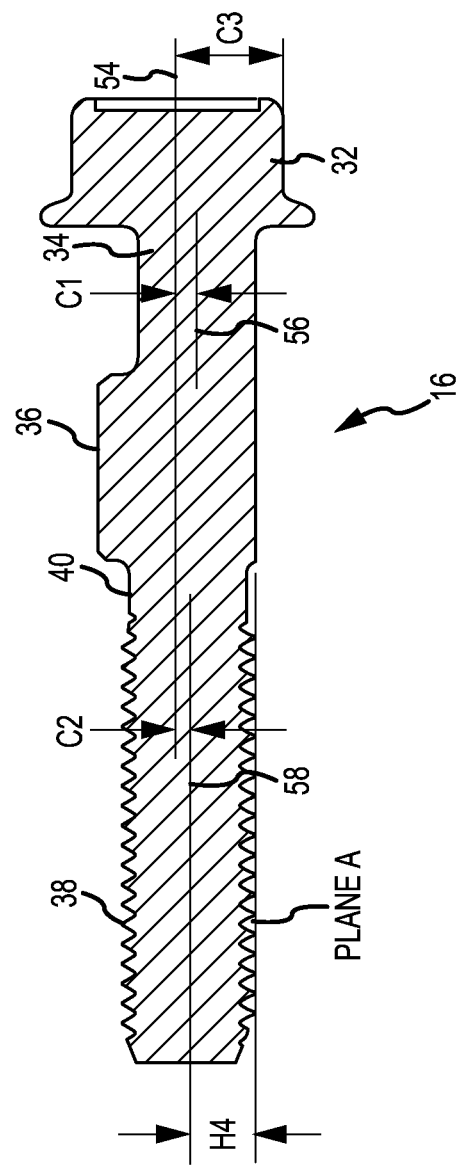
FIG. 8 is a cross-section view of the adjustment bolt illustrated in FIG. 4, viewed along line 8-8 in FIG. 6A.

FIG. 7A is a bottom plan view of the adjustment bolt 16, FIG. 7B is a cross-section view of the adjustment bolt 16 viewed along line 7-7 in FIG. 6A, and FIG. 8 is a cross-section view of the adjustment bolt 16 viewed along line 8-8 in FIG. 6A. The threaded portion 38, the lobe 36, the transition portion 40 and the neck 34 align on one side of the adjustment bolt 16. In one embodiment, this may be a right side of the adjustment bolt 16. As shown in FIGS. 7B and 8, the threaded portion 38, the transition portion 40, the lobe 36, and the neck 34 all align on Plane A. The threaded portion 38 aligns on a major diameter of the threads with the outer diameter of the lobe 36 and neck 34; in other words, the maximum diameter of the threaded portion 38 intersects Plane A. At least a single point on the outer diameter of each the lobe 36, the neck 34 and the threaded portion 34 intersects Plane A at the same location. As best seen in FIG. 7B, the threaded portion 38, the transition portion 40, the lobe 36 and the neck 34 are effectively flush with Plane A, and thus intersect Plane A at the same point.

As the neck 34, the lobe 36, the transition portion 40, and a major diameter of the threaded portion 38 are effectively flush with one another, the adjustment bolt 16 may be used in smaller receiving apertures 44 than bolts used in the past to adjust the camber angle. As the adjustment bolt 16 may be used in smaller receiving apertures 44, the adjustment range for the camber angle may be increased due to less "slop" within the receiving apertures 44 and/or the adjustment aperture 50, and the number of parts or SKUs may be reduced. This is because the adjustment bolt 16 may fit more receiving apertures 44 and/or adjustment apertures 50, for different vehicles and suspension systems than bolts that may have been used in the past. Reducing the number of SKUs may allow an automobile parts store or mechanic to save money by having a reduced inventory. Additionally, the degree of camber angle adjustment may be increased to 2.16 degrees in either the positive or negative direction. This angle adjustment is increased over prior art bolts by about 0.5 degrees. This additional angle adjustment may make a significant difference in certain vehicles with "non-adjustable" suspensions systems, as it provides more adjustment room to better set the camber angle. Additionally, the benefit may either be more fitments from the same SKUs (if lobe size is maintained and the threads are moved to flush), or it can be used to provide additional change if the lobe size is instead increased to 'include' the over-flush thread of the old design. The actual gain where the lobe size is optimized in this manner is approximately half of the thread tip-to-root height (i.e. the amount that the material outer diameter 'grows' when making the threads via rolling). One example of typical outer diameter gain for metric coarse threads is about 0.6 mm, which for a typical 75 mm bolt separation distance gains adjustment amount of about +/−0.46 degrees.

Figure 9:
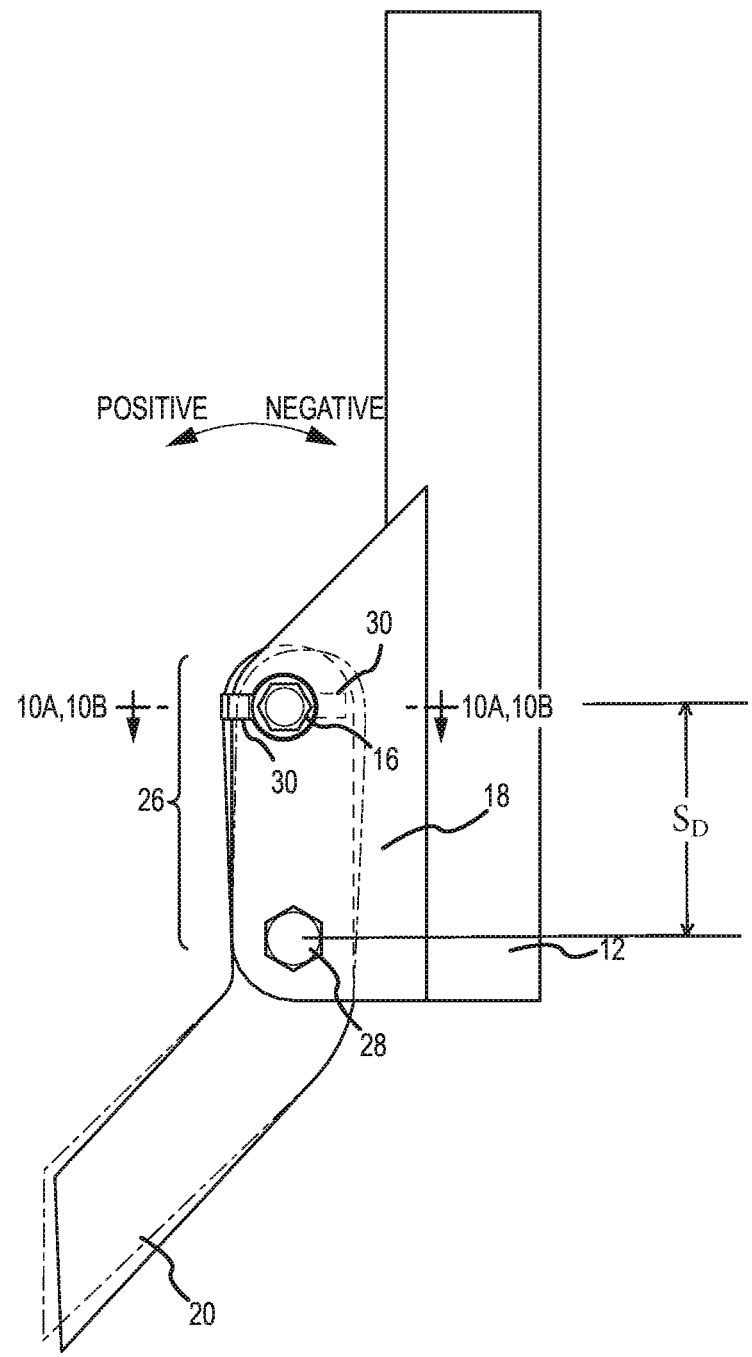
FIG. 9 is a side elevation view of the suspension strut connected to the knuckle via the adjustment assembly, illustrating the knuckle in a positive camber angle, achieved via the adjustment assembly, and in phantom the knuckle in a negative camber angle.

FIG. 9 is a side elevation view of the suspension strut 12 connected to the knuckle 20 via the adjustment assembly 26. FIG. 9 illustrates the knuckle 20 in a positive camber angle position achieved via the adjustment assembly 26. FIG. 9 also includes a phantom illustration of the knuckle 20 in a negative camber angle position. The adjustment bolt 16 may be used to vary the camber angle of a wheel assembly operably connected to the knuckle 20. The position of the protrusion 46 within the receiving aperture 44, as well as the position of the lobe 36 within the adjustment aperture 50, determines the camber angle of the knuckle 20. For example, referring to FIG. 10A, the protrusion 46 may determine whether the adjustment to the camber is in the positive or negative direction, and the position of the lobe 36 within the adjustment aperture 50 may determine the degree of angle change for the camber. Thus, the adjustment assembly 26 may be positioned (for instance installed, adjusted and clamped) such that the knuckle 20 may have a positive camber angle, a negative camber angle, or a neutral camber angle, all with respect to the vehicle (not shown).

Figure 10A:
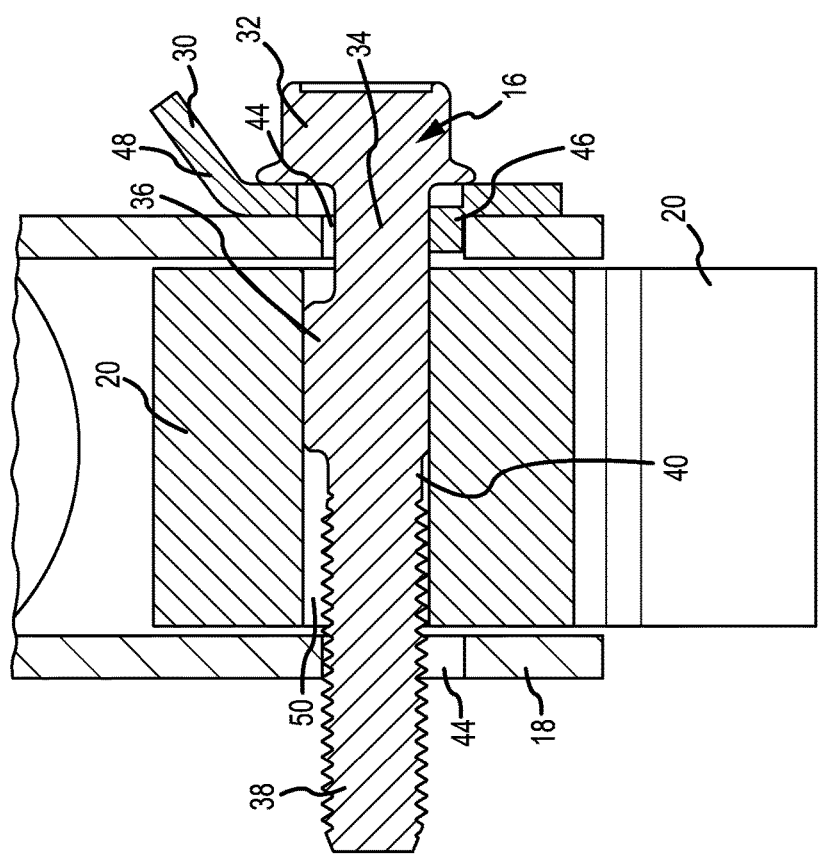
FIG. 10A is a cross-section view of the suspension strut connected to the knuckle via the adjustment assembly illustrated in FIG. 9, having a negative camber angle, viewed along line 10A-10A in FIG. 9.

FIG. 10A is a cross-section view of the suspension strut 12 connected to the knuckle 20 via the adjustment assembly 26 illustrated in FIG. 9, having a negative camber angle, viewed along line 10A-10A in FIG. 9. Referring to FIGS. 9 and 10A, when the lobe 36 is positioned within the adjustment aperture 50 so that the lobe 36 is facing backward towards the strut 12, the knuckle 20 may have a negative camber angle. This may be because the lobe 36 acts to push the knuckle 20 backward (away from a wheel assembly) with respect to the u-bracket 18 and the strut 12. Thus, when a wheel assembly is operably connected to the knuckle 20, a top portion of the wheel assembly may be positioned toward the mid-plane of the vehicle.

Figure 10B:
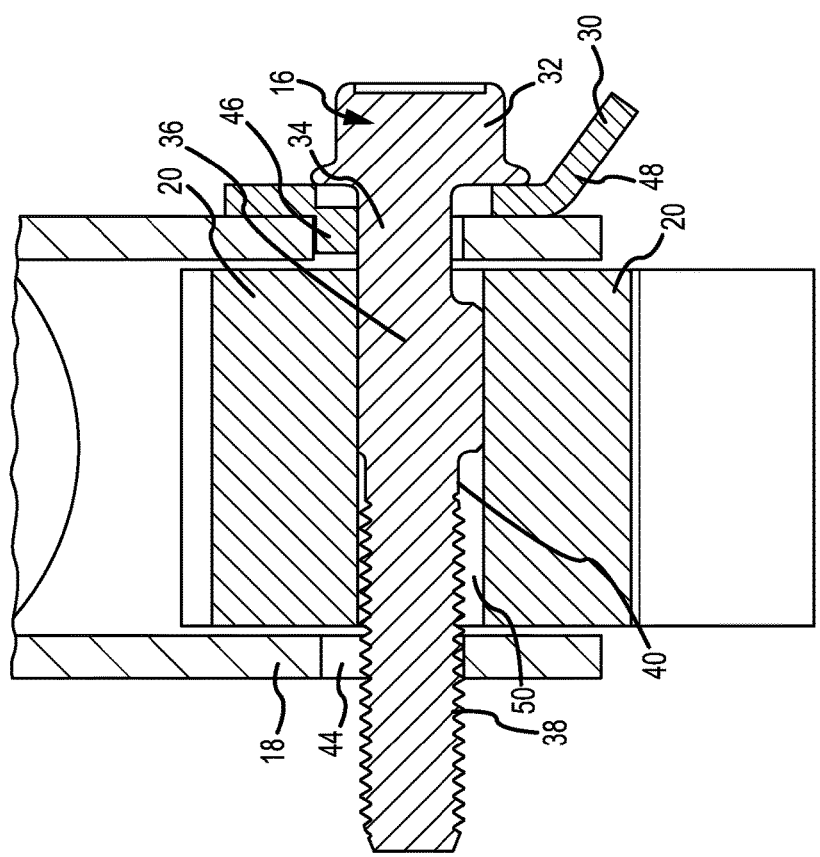
FIG. 10B is a cross-section view of the suspension strut connected to the knuckle via the adjustment assembly illustrated in FIG. 9, having a positive camber angle, viewed along line 10B-10B in FIG. 9.

FIG. 10B is a cross-section view of the suspension strut 12 connected to the knuckle 20 via the adjustment assembly 26, illustrated in FIG. 9 having a positive camber angle, viewed along line 10B-10B in FIG. 9. Referring now to FIGS. 9 and 10B, when the lobe 36 of the adjustment bolt 16 is positioned forward towards the knuckle 20, the knuckle 20 may have a positive camber angle. This may be because the lobe 36 acts to push the knuckle 20 forward (toward a wheel assembly) with respect to the u-bracket 18 and the strut 12. Thus, when a wheel assembly is operably connected to the knuckle 20, a top portion of the wheel assembly may be positioned away from the mid-plane of the vehicle.

Figure 11:
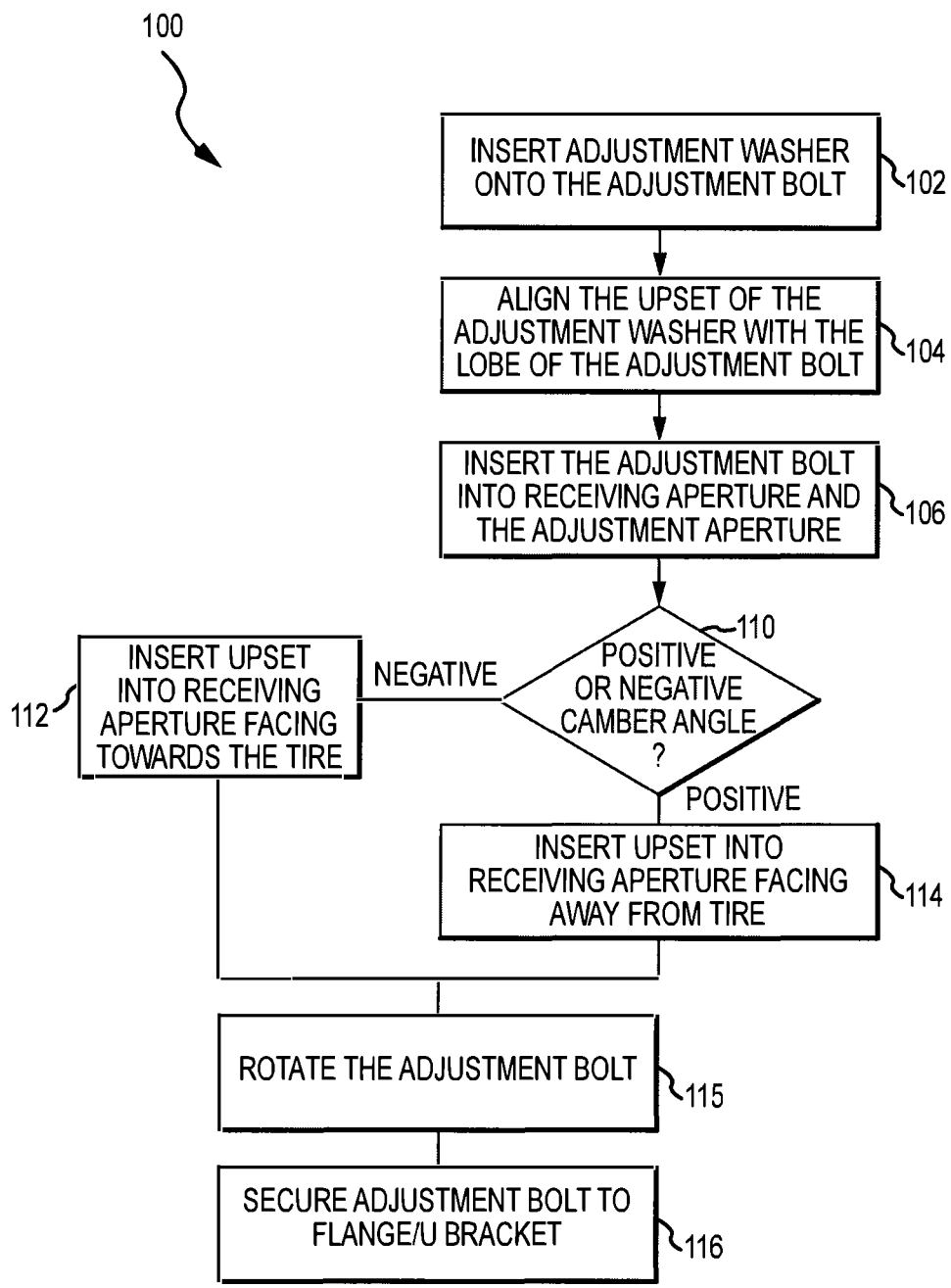
FIG. 11 is a flow chart illustrating a method for adjusting the camber angle on a vehicle using the adjustment assembly.

FIG. 11 is a flow diagram illustrating a method 100 for adjusting the camber angle of a vehicle. The method 100 begins with operation 102 and the offset washer 30 is inserted onto the adjustment bolt 16. For example, the offset washer 30 may be inserted around the threaded portion 38 and slid over the lobe 36 and around the neck 34. After operation 102, the method 100 proceeds to operation 104 and the protrusion 46 is aligned with the lobe 36 of the adjustment bolt 16. For example, the protrusion 46 should be positioned on the same side of the adjustment bolt 16 as the side of the lobe 36 that is not aligned with the neck 34 and major diameter of the threaded portion 38. In other words, it should be positioned on the left side of the adjustment bolt 16, where the lobe 36 extends outwards past the threaded portion 38 and the neck 34. Once the protrusion 46 has been aligned with the lobe 36, the method 100 proceeds to operation 106. In this operation 106, the adjustment bolt 16 is inserted into the receiving aperture 44 and the adjustment aperture 50. The adjustment bolt 16 may be inserted so that the offset washer 30 is substantially flush with the u-bracket 18 or flange.

After the adjustment bolt 16 is inserted into the receiving aperture 44 and the adjustment aperture 50, the method 100 proceeds to operation 110. In this operation 110, the user determines whether the camber angle for the suspension system 10 needs to be adjusted in either the positive or negative direction. If the camber angle needs to be adjusted to a positive camber angle, the method 100 proceeds to operation 114. In operation 114, the protrusion 46 is inserted into the receiving aperture 44 such that it faces away from the tire or the entire wheel assembly of the vehicle. If, on the other hand, the camber angle needs to be adjusted to a negative camber angle, the method 100 proceeds to operation 112. In operation 112, the protrusion 46 is inserted into the receiving aperture 44 such that it faces toward the wheel assembly. It should be noted that if the adjustment bolt 16 is used in a lower receiving aperture on the u-bracket 18 (e.g., the receiving aperture for fastener 28 illustrated in FIG. 9), operations 112 and 114 may be reversed for achieving a positive or negative adjustment. In other words, if the adjustment bolt 16 is used in a lower receiving aperture, for positive adjustment the protrusion 46 may be inserted into the receiving aperture so that it faces toward the tire and for negative adjustment the protrusion 46 may be inserted into a lower receiving aperture so that it faces away from the tire. After operations 112, 114, the method 100 proceeds to operation 115 and the adjustment bolt 16 is rotated. As the adjustment bolt 16 rotates, the lobe 36 may be adjusted "out of phase" with the protrusion 46, creating a change in camber.

After operation 115, the method 100 proceeds to operation 116 and the adjustment bolt 16 is secured to the strut 12 and u-bracket 18. This operation 116 may involve inserting the nut 32 onto the adjustment bolt 16 and then tightening the nut 32 onto the threaded portion 38. However, the adjustment bolt 16 may be tightened to the strut 12 and/or the u-bracket 18 in other appropriate manners.

Figure 12:
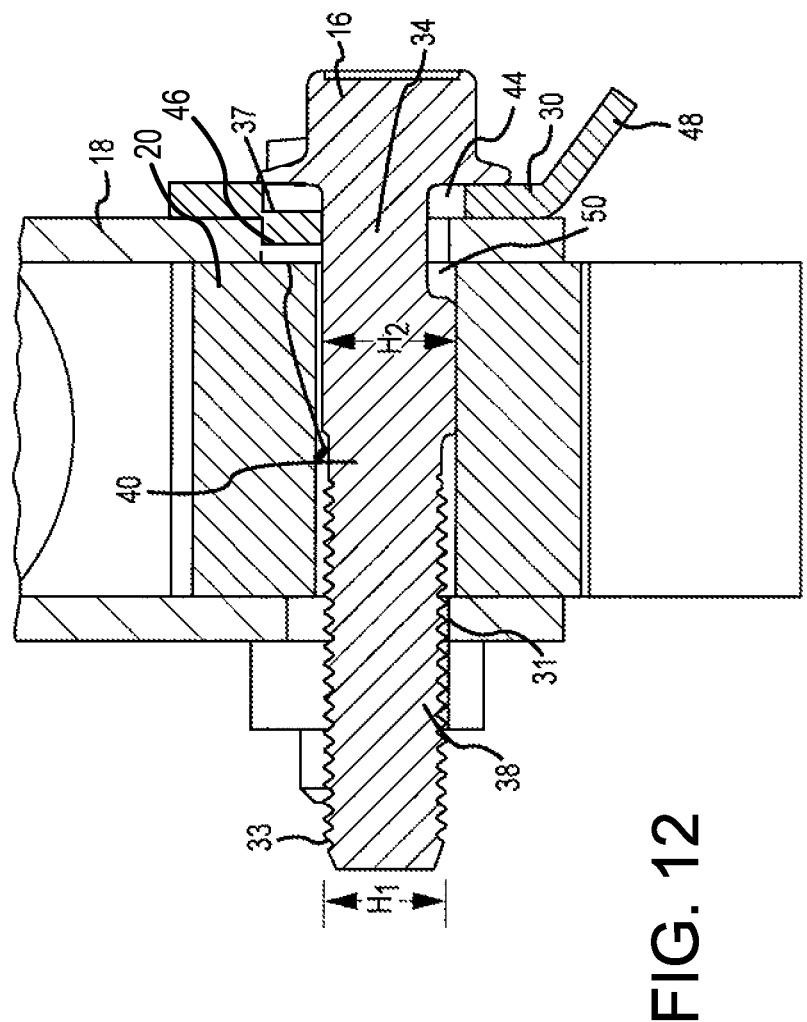
FIG. 12 is a cross-section view of a suspension strut connected to the knuckle via the adjustment assembly illustrated in FIG. 9, and with the adjustment bolt having an increased thread root diameter, viewed along line 10A-10A in FIG. 9.

Other examples of the adjustment bolt and adjustment assembly will now be discussed. FIG. 12 is a cross-section view of the suspension strut connected to the knuckle via the adjustment assembly and with the adjustment bolt having an increased threaded portion height or diameter, viewed along line 10A-10A in FIG. 9. With reference to FIG. 12 (and as also shown in FIGS. 10A and 10B), in some instances the receiving apertures 44 defined in the u-bracket 44 of the strut 12 may have a larger diameter than the adjustment aperture 50 defined within the knuckle 20. In these instances, the major diameter of the threads 51 of the threaded portion 38 of the adjustment bolt 16 may be increased so that the crests of the threads may engage with a bottom inner wall 31 of the u-bracket 18 defining the receiving aperture 44. In general, the threads may be enlarged until they interfere with the opposite side of the strut hole from the protrusion 46 position. In other words, Thread(max)=Strut Hole−Protrusion Thickness (and 'error'). Additionally, by increasing the diameter of the threaded portion 38, a root diameter of the threads 51 (that is, the diameter or height as measured from the low point or root of each thread 51), may also be larger than a diameter or height of the neck 34. The diameter of the threads may be equal to the diameter of the neck.

With reference to FIG. 12, in some instances the top edge or major diameter of each of the threads 51 may be sized to substantially touch or engage the inner wall 31 defining the receiving aperture 44 within the u-bracket 18 of the strut 12. Since clamp load is directly related to torque divided by thread diameter, the gain in clamp force comes from the higher torque that a thicker (for instance, meaning larger diameter) thread can manage prior to failing.

With continued reference to FIG. 12, as a specific example, the receiving aperture may be approximately 16.5 mm and the adjustment apertures 50 may be approximately 14.5 mm (although other diameter sizes are envisioned as well). Continuing with this example, the major diameter of the threads 51 or H1 may be approximately 13 mm, a root diameter of the threads may be approximately 11.1 mm, the height H2 of the lobe 36 may be approximately 14 mm, and a diameter or height H3 of the neck 34 may be approximately 10.8 mm. With these values, the clamp load of the adjustment bolt 16 may be increased by approximately 17.4% compared to an adjustment bolt where the thread diameter has not been increased as shown in FIG. 12. It should be noted that the amount of gain or percentage increase in clamp load may depend not only the values/heights of the adjustment bolt 16, but also on a ratio of the receiving aperture 44 to adjustment aperture 50. Additionally, in some instances the gain will increase more with larger thread sizes (e.g., increased height H1) as recommended maximum torque for a fastener typically increases non-linearly with thread diameter. The resulting clamp load generally increases linearly with thread size. Specifically, in some instances torque for the adjustment bolt 16 may be related to the thread diameter by equation 1 (Eq. 1) below:

$$\text{Torque} = 0.0672 D^3 - 0.5879 D^2 - 18.381 \quad \text{Eq. 1}$$

As shown in Eq. 1, torque of the adjustment bolt 16 may increase in a non-linear fashion with an increase in the height H1 of the threaded portion 38. Thus, in instances of larger thread sizes for the adjustment bolt 16 shown in FIG. 12, there may be a larger increase in clamping load than in the specific example discussed above.

In some instances, the adjustment ranges may be approximately the same as for the adjustment bolt shown in FIGS. 10A and 10B. In other words, although the major diameter of the threads 51 may increase, the adjustment distance between fully negative and fully positive camber may be the same. However, the neck may stay the same size to achieve the same change, thus it will become the weak point in the adjustment system.

Figure 13:
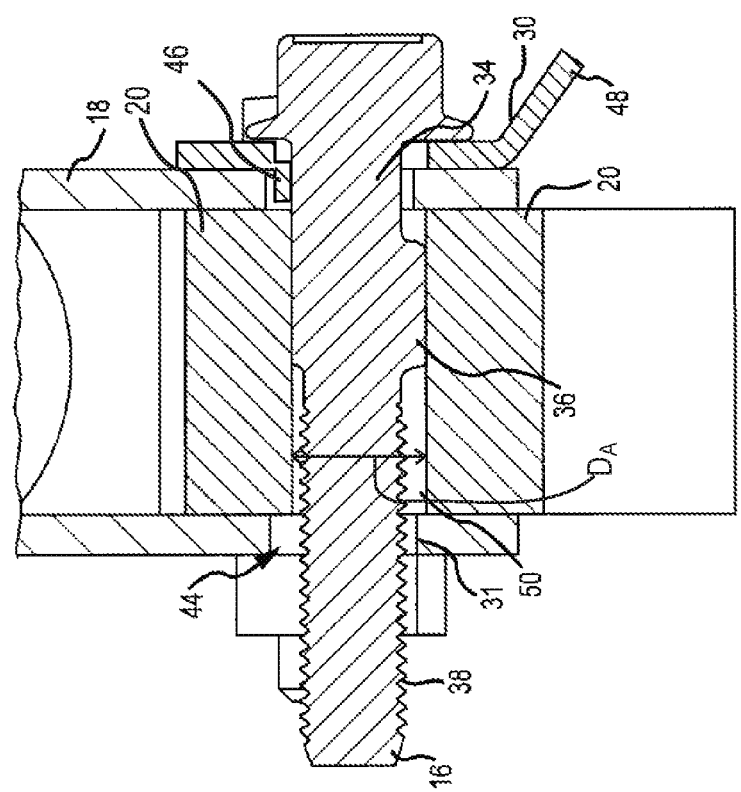
FIG. 13 is a cross-section view of the suspension strut connected to the knuckle via the adjustment assembly illustrated in FIG. 9, and with the adjustment bolt having an increased lobe diameter, viewed along line 10A-10A in FIG. 9.

In yet other embodiments, the adjustment bolt 16 may be configured to maximize the adjustment range so as to have a greater degree of camber adjustment. FIG. 13 is a cross-sectional view of the adjustment assembly viewed along line 10A-10A in FIG. 9. In this example, the height H2 of the lobe 36 may be increased to be approximately the same as the height or diameter of the adjustment aperture 50 defined within the knuckle 20. Specifically, as shown in FIG. 13, the lobe 36 diameter or height H2 may be approximately the same as the diameter $D_A$ of the adjustment aperture 50. This may allow the lobe 36, as it is rotated within the adjustment aperture 50, to more directly cause the knuckle 20 to adjust in position. In other words, because the height H2 of the lobe 36 may be approximately the same as the diameter $D_A$ of the adjustment aperture 50, substantially every degree of rotation or movement of the lobe 36 may cause the knuckle to move, as the lobe 36 may not have space to rotate within the adjustment aperture 50 without engaging and moving the knuckle 20. There is generally some clearance, but the clearance may be minimized in order to allow the greatest possible benefit for the change. As an example, acceptable clearances have been found to be 0.010-0.015 inches.

Typical bolts for adjusting camber in vehicles do not have a cam or lobe diameter that is approximately the same as the adjustment aperture because the threads of a bolt would be "over-flush" to the lobe. However, with reference to FIGS. 5A, 6A, and 7, the different center lines C2 and C3 of the threaded portion 38 and the lobe 36, as well as the varying heights H1 and H2, the height of the lobe 36 can be varied without causing the major diameter of the threads 51 to extend past the plane A, and thus may not be "over flush" with the lobe 36.

With reference to FIGS. 9 and 13, the lower fastener 28 may function as a pivot point for the knuckle 20 as it rotates due to the adjustment bolt 16, and, specifically, as the lobe 36 rotates within the adjustment aperture 50. In some instances, the lower fastener 28 may be spaced from the adjustment bolt 16 on the u-bracket 18 by a spacing distance $S_D$ (see FIG. 9). The spacing distance $S_D$ may affect the range of camber adjustment for the adjustment assembly 26—as $S_D$ reduces, the achievable camber range increases. In some embodiments, adjusting bolts could be put in both holes to double the adjustment range.

In a specific example, the receiving aperture 44 within the u-bracket 18 may be approximately 16.5 mm, the adjustment aperture 50 or knuckle hole may be approximately 14.5 mm, the height H2 of the lobe 36 may be approximately 14.5 mm, and the spacing distance $S_D$ between the adjustment bolt 16 and the fastener 28 may be approximately 75 mm. In this example, by increasing the height H2 of the lobe 36, the adjustment assembly 26 may increase the range of adjustment over conventional camber bolts by approximately 26.1%. However, the gain percentage for camber range may vary with the spacing distance $S_D$. That is, if all other values stay approximately the same, for smaller values of the spacing distance $S_D$ the gain in adjustment range percentage increase may increase. This is because the closer the fastener 28 and thus pivot point of the knuckle 20 is to the adjustment bolt 20, the greater the range of motion the knuckle 20 may have around the pivot point. Additionally, continuing the example, the adjustment range may be +/−1 to 2.5 degrees, and specifically +/−1.844 degrees. This represents an increase in adjustment range of approximately 0.382 degrees (in this example) over the equivalent 2-axis bolt in the comparison. One example of the value of Sd, for instance, is 75 mm. Other spacing values being larger or smaller are contemplated. That is, the camber change that may be implemented by the adjustment bolt 16 may be increased to include 1.844 degrees of additional range of movement in either the positive or negative orientation.

Figure 14:
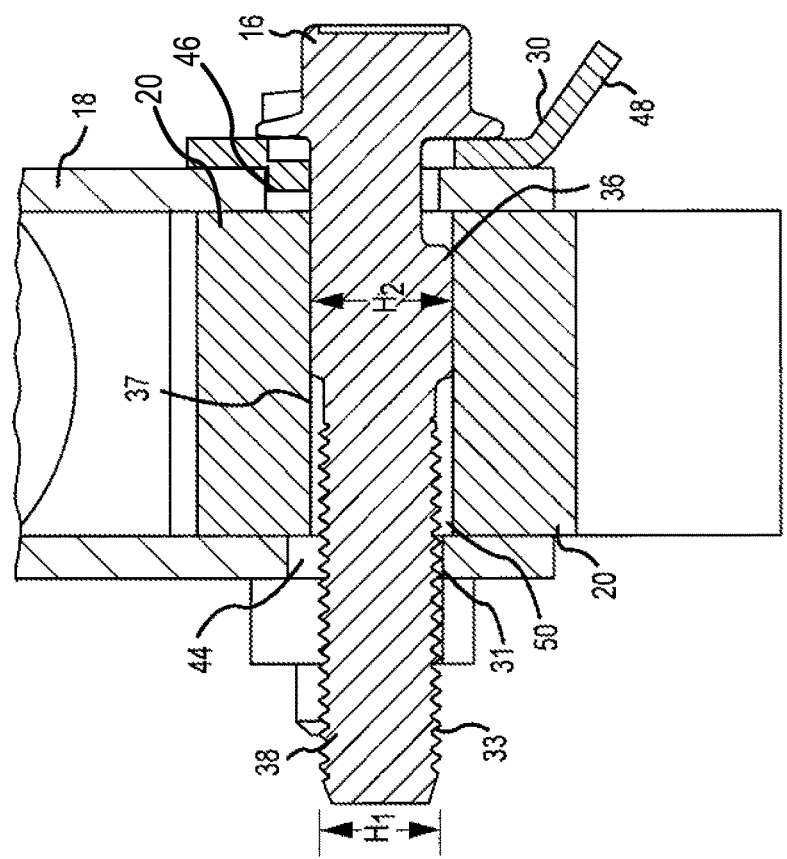
FIG. 14 is a cross-section view of the suspension strut connected to the knuckle via the adjustment assembly illustrated in FIG. 9, and with the adjustment bolt having an increased thread root diameter and increased lobe diameter, viewed along line 10A-10A in FIG. 9.

In some instances, the adjustment bolt 16 of FIG. 12 may be combined with the adjustment bolt 16 of FIG. 13. FIG. 14 is a cross-sectional view of the adjustment assembly viewed along line 10A-10A in FIG. 9 including another example of the adjustment bolt. In FIG. 14, the adjustment bolt 16 may include a lobe height H2 or diameter that may be substantially the same as the adjustment aperture 50 and the major diameter of the threads 51 may be selected so that at least one portion of the threads 51 engages a portion of the inner wall 31 of the u-bracket 18. In the embodiment illustrated in FIG. 14, the clamp load may be optimized based on an optimized adjustment range, and the lobe 36 height H2 is increased to better affect motion of the knuckle 20, providing an increased adjustment range and an increased clamp load. This is different than the embodiment in FIG. 13, where there is a gap between the crest of the threads 51 and the bottom inner wall 31 of the receiving aperture 44. Accordingly, as compared to the adjustments bolt 16 of FIG. 13, the adjustment bolt 16 illustrated in FIG. 14 will have an increased clamp load for the assembly 26.

In a specific example, with reference to FIG. 14, the receiving aperture 44 may be approximately 16.5 mm, the adjustment aperture 50 may have a diameter of approximately 14.5 mm, the lobe 36 may have a diameter of height H2 or approximately 14.5 mm, the neck 36 may have a diameter or height H3 of approximately 10.8 mm, and the threads 51 may have a root diameter of approximately 11.1 mm. In this example, the clamp load may be increased over conventional bolts by approximately 17.4% and the camber adjustment range may be increased by approximately 26.1%.

As can be seen in these various cross-sectional views, the thickness W of the offset washer 30 may also drive the height H1 of the threaded portion 38 that may be required for the adjustment bolt 16 to fit through the receiving apertures 44 within the u-bracket 18. In these instances, because the height H1 of the neck 34 can be increased for the same size apertures 44, 50, the strength of the neck 34 may be increased for the same size assemblies.

Figure 3L:
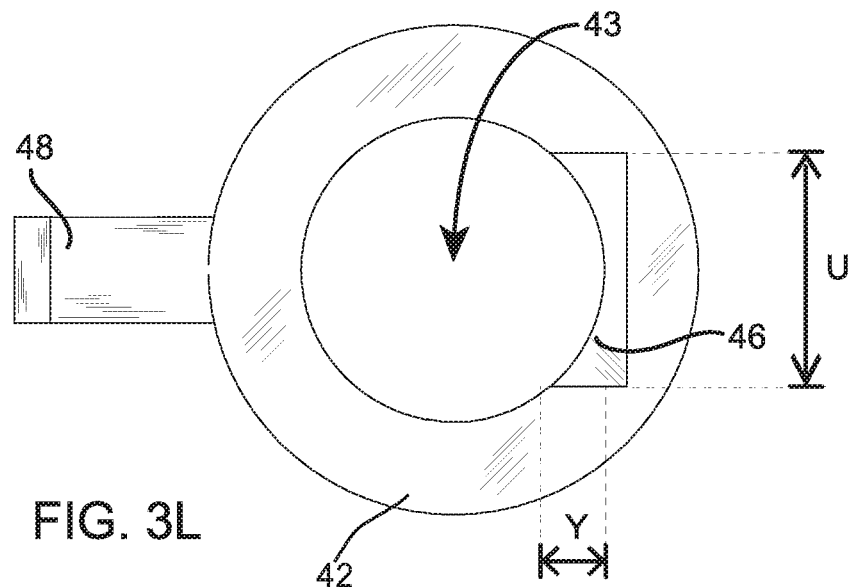
FIG. 3L is a top view of another embodiment of the upset in an offset washer and FIG. 3M is an isometric bottom view of the same offset washer.
Figure 3M:
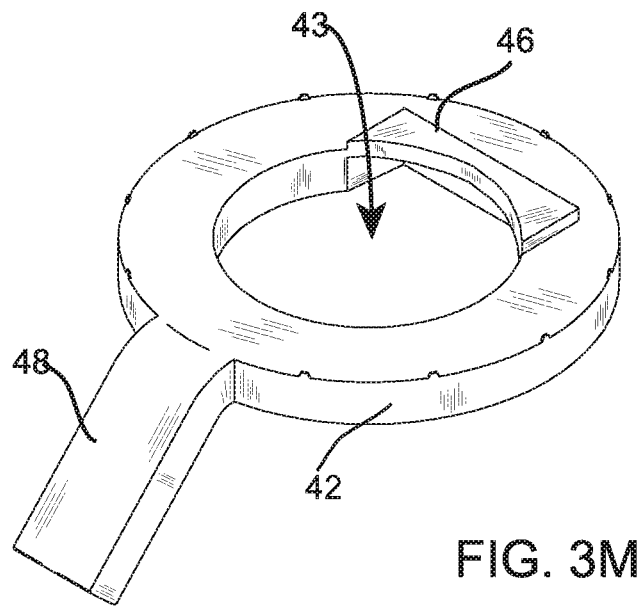
Figure 3N:
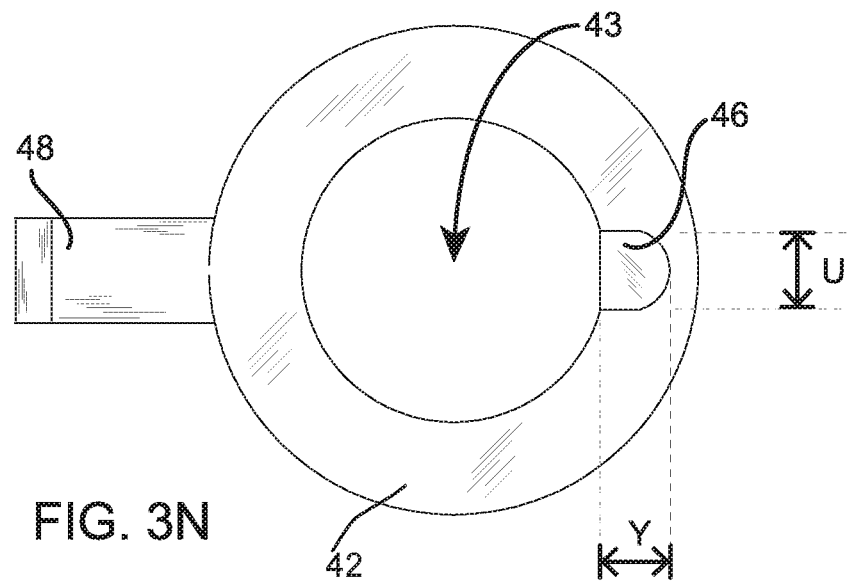
FIG. 3N is a top view of another embodiment of the upset in an offset washer.
Figure 3O:
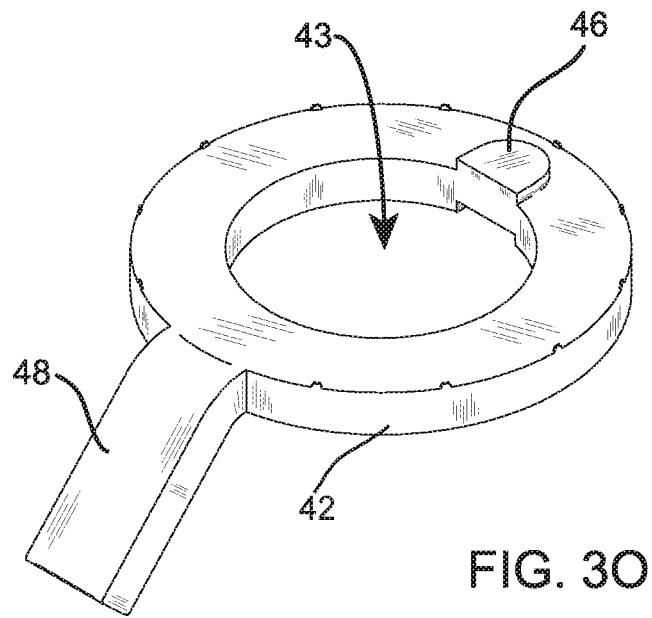
FIG. 3O is an isometric bottom view of the offset washer of FIG. 3N.

It should be noted that in some instances, the receiving aperture 44 within the u-bracket 18 may be relatively round. The protrusion 46 may be sized to fit within the aperture 44. For example, as shown in FIGS. 3L and 3O, the protrusion may have a transverse width U that is approximately equal to or smaller than the width of the receiving aperture 44. As shown in FIG. 3O, the width U may be less than half the width of the aperture 43 (the aperture 43 being similar to the width of the receiving aperture 44). This small size of the protrusion 46 may allow for ease of insertion into the aperture 44. Whereas in embodiments having a protrusion similar in width to the width of the aperture 44, the protrusion may have a more secure fit limiting rotation of the washer 30 relative to the receiving aperture 44.

When using an upsetting technique to form the protrusion 46, the portion of the protrusion 46 facing the neck 34 can maintain the same profile as the aperture 43. As such, when the aperture 43 is round, the interior surface or edge 76 may maintain the curvature of the round profile of the aperture 43 as shown in FIGS. 3L and 3M. Alternatively, when a portion of the aperture 43 is flat, the interior surface or edge 76 may also be flat. The interior surface or edge 76 may have any profile, the protrusion may have any transverse width U, and the protrusion may have any longitudinal width Y. FIGS. 3A-3H illustrates one embodiment of the profile of the protrusion 46. In this embodiment, the protrusion forms a crescent-shaped upset protrusion 46 around at least a portion of the aperture 43. For example, the crescent-shaped protrusion 46 may extend around approximately ¼-½ of the circumference of the aperture 43. In one example, the crescent-shaped protrusion 46 may extend around approximately ⅓ of the circumference of the aperture 43. The edges of the crescent-shaped protrusion 46 may be tangential at the intersection (i.e. the merger of 47a to 47b) with the circumference of the aperture 43. Alternatively, the intersection may be non-tangential.

Figure 3P:
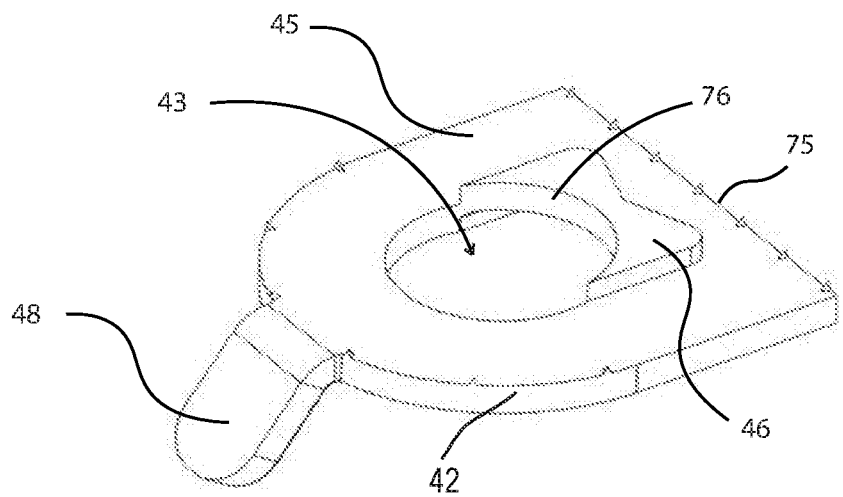
FIG. 3P is an isometric bottom view of another embodiment of the offset washer.
Figure 3Q:
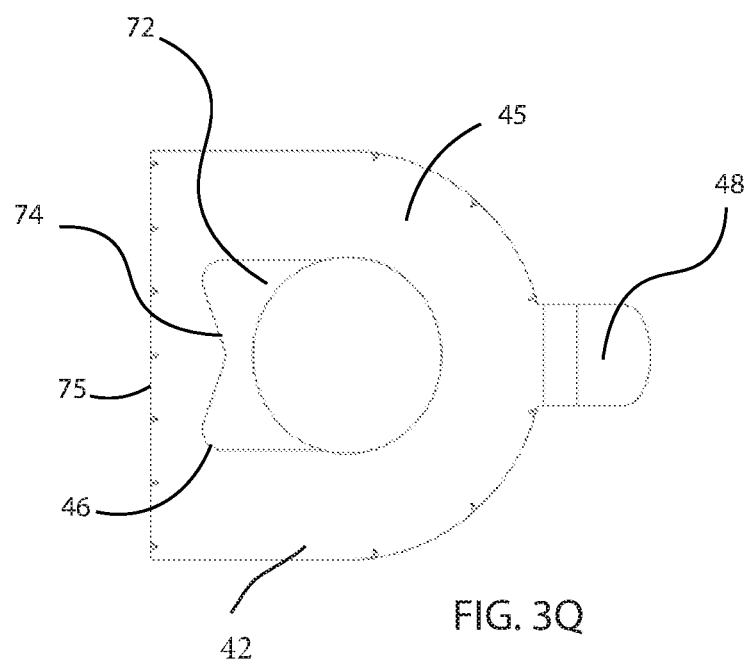
FIG. 3Q is a top view of the offset washer of FIG. 3P.

In accordance with various embodiments, as shown in FIGS. 3P-3Q, the protrusion 46 may have a surface 72 with a profile that conforms to any shape. A side surface 74 of protrusion 46 may have any shape including for example a flat, concave, convex, or a form that varies. As shown in FIGS. 3P-3Q, the side surface 74 may be concave with separate flat or rounded surface converging. The sides of the protrusions may be flat. The sides of the protrusions may be tangential with the aperture 43.

Figure 3R:
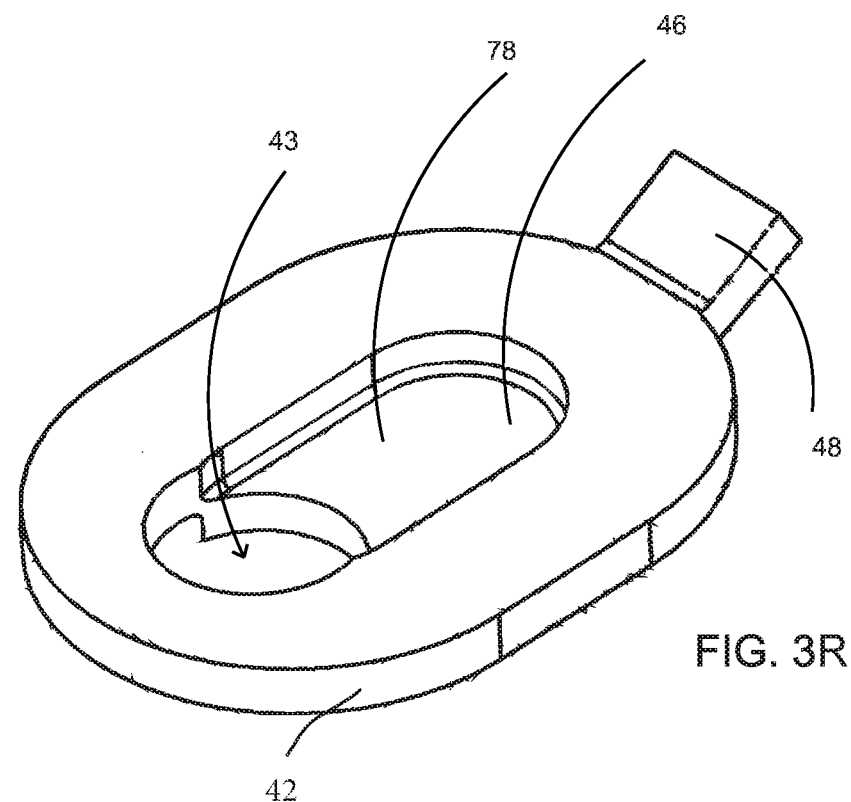
FIG. 3R is a top view of another embodiment of the upset in another embodiment of an offset washer.
Figure 3S:
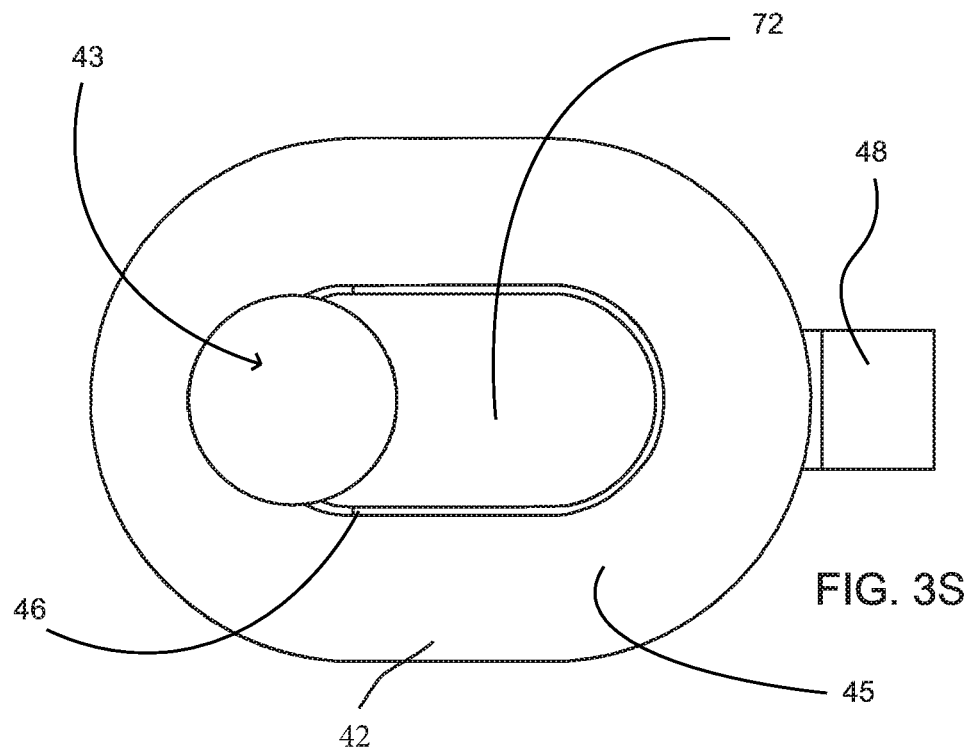
FIG. 3S is a bottom view of the offset washer of FIG. 3R.

In various embodiments, the washer 30 profile defined by the profile of bottom surface 45 may include at least one side surface 75 that is flat. Such a flat surface may aid in securing the washer to suspension components by providing a mating surface or clearance for other features. Other surface profiles may also be included. In accordance with various embodiments, as shown in FIGS. 3R-3S, the protrusion 46 may have a surface 72 with an oblong profile. The oblong profile may form an oval, an ellipse or a shape comprising connected rounded ends. As shown, the connected rounded ends may be connected by flat side walls. In various embodiments, the protrusion may entirely surround the aperture 43. In such an embodiment, the aperture 43 may extend through only the protrusion, e.g. the side walls of the aperture 43 may not intersect the top surface of washer 30, but, may instead intersect with the protrusion surface 78. The bottom surface 72 of the protrusion 46 may also surround the aperture 43. This structure may be formed, in one example, by upsetting the entire area around the aperture, (i.e. punch the area without separating it from the rest of the washer. The sides of the protrusions may be flat with the ends rounded. This protrusion may be sized to match the hole or slot on which the washer 30 is positioned consistent with the other discussion of the adjustment mechanism discussed herein.

Figure 15:
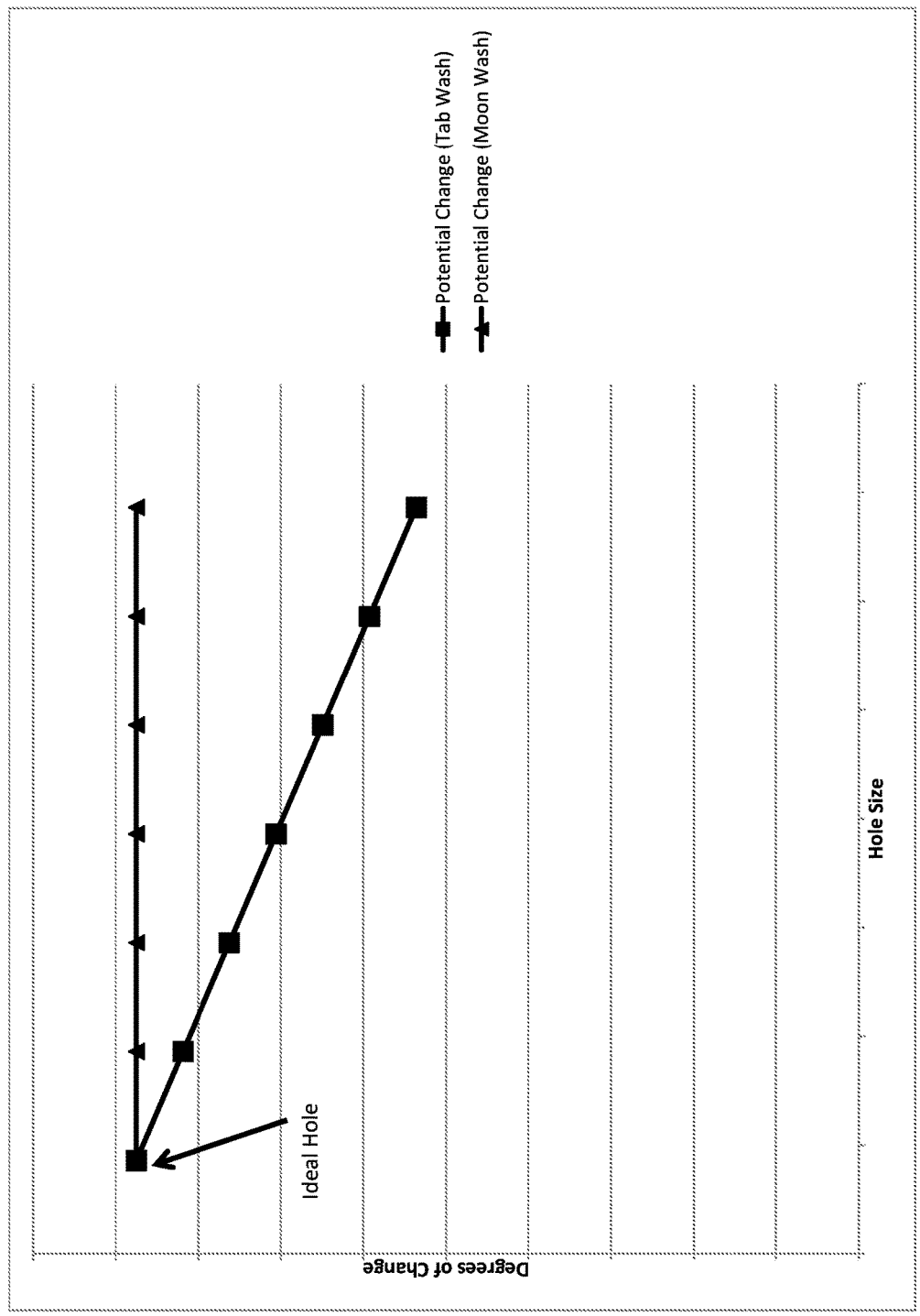
FIG. 15 is a graph showing the comparison of an upset washer versus a washer with a tang.

As shown in FIG. 15, a graph illustrates the comparison of an offset washer (e.g. washer with an upset such as a moon washer) verse a washer with a bent tab. With a tightly controlled ideal hole size, the difference between the upset washer and the tabbed washer is nominal As indicated in the chart, as the aperture size 44 of the bracket (e.g. bracket 66 or bracket 18) gets bigger (i.e. departs from the ideal hole size) the degrees of change with the traditional tabbed washer decreases. However, the unexpected advantage of the offset washer is that the degrees of change remain constant despite the hole size departing from the ideal.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

What is claimed:

1. An offset washer for adjusting camber angle in a vehicle comprising:

a body having an upper surface and a lower surface defining a body thickness;
an aperture extending through the body;
a spacing protrusion having a longitudinal width different than the body thickness from the upper surface to the lower surface with the spacing protrusion extending from the lower surface such that the spacing protrusion obscures the aperture proximal to the lower surface defining a larger aperture opening at the upper surface than the aperture opening at the lower surface, wherein the spacing protrusion is configured to be inserted into a receiving aperture on a flange of a vehicle suspension system, wherein the spacing protrusion defines a crescent shaped step along a wall of the aperture.

2. The offset washer of claim 1, wherein the step is formed in a material of the body along a portion of an edge of the aperture.

3. The offset washer of claim 2, wherein the step in the material is formed by upsetting the portion of the edge of the aperture when forming the aperture.

4. The offset washer of claim 1, wherein the longitudinal width is greater than the thickness from the upper surface to the lower surface.

5. The offset washer of claim 1, wherein the longitudinal width is less than the thickness from the upper surface to the lower surface.

6. The offset washer of claim 1, wherein the aperture is configured to receive a fastener having a neck and a lobe along a length of the fastener, wherein the neck has a neck diameter that is smaller than the lobe having a lobe diameter and the longitudinal width of the spacing protrusion is about equal to the difference between the neck diameter and the lobe diameter.

7. The offset washer of claim 1, wherein a lateral width of the spacing protrusion is less than a width of the receiving aperture.

8. The offset washer of claim 1, wherein a thickness of the spacing protrusion is about the same as the thickness from the upper surface to the lower surface.

9. The offset washer of claim 1, wherein the aperture is generally circular and the step forms an oblong extension away from the circular aperture.

* * * * *